(12) United States Patent
La O' et al.

(10) Patent No.: US 10,980,317 B2
(45) Date of Patent: Apr. 20, 2021

(54) ARTICLE OF FOOTWEAR INCORPORATING WOUND ELEMENT, AND RELATED METHODS OF MANUFACTURE

(71) Applicant: New Balance Athletics, Inc., Boston, MA (US)

(72) Inventors: Gabriel La O', Nashua, NH (US); Connor James Hutchinson, Plympton, MA (US)

(73) Assignee: New Balance Athletics, Inc., Boston, MA (US)

( * ) Notice: Subject to any disclaimer, the term of this patent is extended or adjusted under 35 U.S.C. 154(b) by 180 days.

(21) Appl. No.: 15/936,707

(22) Filed: Mar. 27, 2018

(65) Prior Publication Data
US 2018/0271216 A1    Sep. 27, 2018

Related U.S. Application Data

(60) Provisional application No. 62/477,163, filed on Mar. 27, 2017.

(51) Int. Cl.
*A43B 23/00* (2006.01)
*A43B 23/02* (2006.01)
(Continued)

(52) U.S. Cl.
CPC .......... *A43B 23/027* (2013.01); *A43B 3/0036* (2013.01); *A43B 5/00* (2013.01);
(Continued)

(58) Field of Classification Search
CPC ... A43B 23/027; A43B 23/0265; A43B 23/04; A43B 23/024; A43B 23/0235;
(Continued)

(56) References Cited

U.S. PATENT DOCUMENTS 2,641,004 A    6/1953    Whiting et al.
3,457,962 A *  7/1969    Shobert .................. A63B 53/10
                                                              138/144
(Continued)

FOREIGN PATENT DOCUMENTS

JP    04-257356 A  *  9/1992
JP    07-18549 A   *  7/1995
(Continued)

OTHER PUBLICATIONS

Machine Translation of Japanese Patent 07-15849, Date Unknown.*
Machine Translation of Japanese Patent 07-258948, Date Unknown.*
Machine Translation of Japanese Patent 04-257356, Date Unknown.*

*Primary Examiner* — Jeffry H Aftergut
(74) *Attorney, Agent, or Firm* — Goodwin Procter LLP

(57) ABSTRACT

The invention relates to systems and methods for creating wound material portions for incorporation into an article of footwear. More particularly, one method of manufacturing at least a portion of an upper for an article of footwear, in accordance with the invention, includes the steps of providing a support structure, providing a fiber delivery system, tacking a first end of a first fiber onto the support structure, moving the support structure with respect to the fiber delivery system to wind the first fiber around the support structure, cutting a second end of the first fiber upon positioning of the first fiber onto the support structure, and treating at least a portion of the first fiber to fixedly hold it in a wound arrangement and form a fabric layer for incorporation into an article of footwear.

19 Claims, 27 Drawing Sheets

(51) Int. Cl.

| | | |
|---|---|---|
| *A43B 13/04* | (2006.01) | |
| *A43B 13/26* | (2006.01) | |
| *A43B 9/00* | (2006.01) | |
| *A43B 3/00* | (2006.01) | |
| *A43D 95/02* | (2006.01) | |
| *B32B 1/00* | (2006.01) | |
| *B32B 5/02* | (2006.01) | |
| *B32B 5/26* | (2006.01) | |
| *B32B 37/24* | (2006.01) | |
| *B32B 38/00* | (2006.01) | |
| *A43B 5/00* | (2006.01) | |
| *A43B 23/04* | (2006.01) | |
| *A43D 3/02* | (2006.01) | |
| *B33Y 80/00* | (2015.01) | |

(52) U.S. Cl.
CPC ............... *A43B 9/00* (2013.01); *A43B 13/04* (2013.01); *A43B 13/26* (2013.01); *A43B 23/024* (2013.01); *A43B 23/028* (2013.01); *A43B 23/0215* (2013.01); *A43B 23/0235* (2013.01); *A43B 23/0255* (2013.01); *A43B 23/0265* (2013.01); *A43B 23/04* (2013.01); *A43D 95/02* (2013.01); *B32B 1/00* (2013.01); *B32B 5/02* (2013.01); *B32B 5/26* (2013.01); *B32B 37/24* (2013.01); *B32B 38/004* (2013.01); *A43D 3/02* (2013.01); *A43D 2200/10* (2013.01); *B32B 2305/10* (2013.01); *B32B 2310/022* (2013.01); *B32B 2437/02* (2013.01); *B33Y 80/00* (2014.12)

(58) Field of Classification Search
CPC ..... A43B 23/0255; A43B 13/04; A43B 13/26; A43B 23/028; A43B 9/00; A43B 3/0036; A43B 23/0215; A43B 5/00; A43D 95/02; A43D 2200/10; A43D 3/02; B32B 1/00; B32B 5/02; B32B 5/26; B32B 37/24; B32B 38/004; B32B 2437/02; B32B 2305/10; B32B 2310/022; B33Y 80/00
See application file for complete search history.

(56) References Cited

U.S. PATENT DOCUMENTS

| | | | |
|---|---|---|---|
| 7,748,145 | B2 | 7/2010 | Jones et al. |
| 7,785,290 | B2 | 8/2010 | Alpini et al. |
| 8,661,714 | B2 | 3/2014 | Sussmann |
| 8,844,167 | B2 | 9/2014 | Greene |
| 9,144,268 | B2 | 9/2015 | Swigart et al. |
| 9,414,645 | B2 | 8/2016 | Krueger |
| 9,788,600 | B2 | 10/2017 | Wawrousek et al. |
| 2004/0118018 | A1* | 6/2004 | Dua .................. A43B 1/04 36/45 |
| 2004/0181972 | A1 | 9/2004 | Csorba |
| 2005/0038503 | A1 | 2/2005 | Greenhalgh et al. |
| 2007/0186760 | A1* | 8/2007 | Masao .................. D04C 3/48 87/14 |
| 2010/0175276 | A1* | 7/2010 | Dojan .................. A43B 3/26 36/47 |
| 2012/0180339 | A1 | 7/2012 | Izquieta Anaut |
| 2013/0269211 | A1 | 10/2013 | Deans et al. |
| 2014/0377488 | A1 | 12/2014 | Jamison |
| 2016/0166000 | A1* | 6/2016 | Bruce .............. A43B 23/0265 |
| 2016/0166010 | A1* | 6/2016 | Bruce .................. B29C 64/00 12/133 R |
| 2016/0345674 | A1* | 12/2016 | Bruce .................. A43B 23/021 |

FOREIGN PATENT DOCUMENTS

| | | | |
|---|---|---|---|
| JP | 07-258948 | A * | 10/1995 |
| WO | WO-2015105564 | A1 | 7/2015 |

* cited by examiner

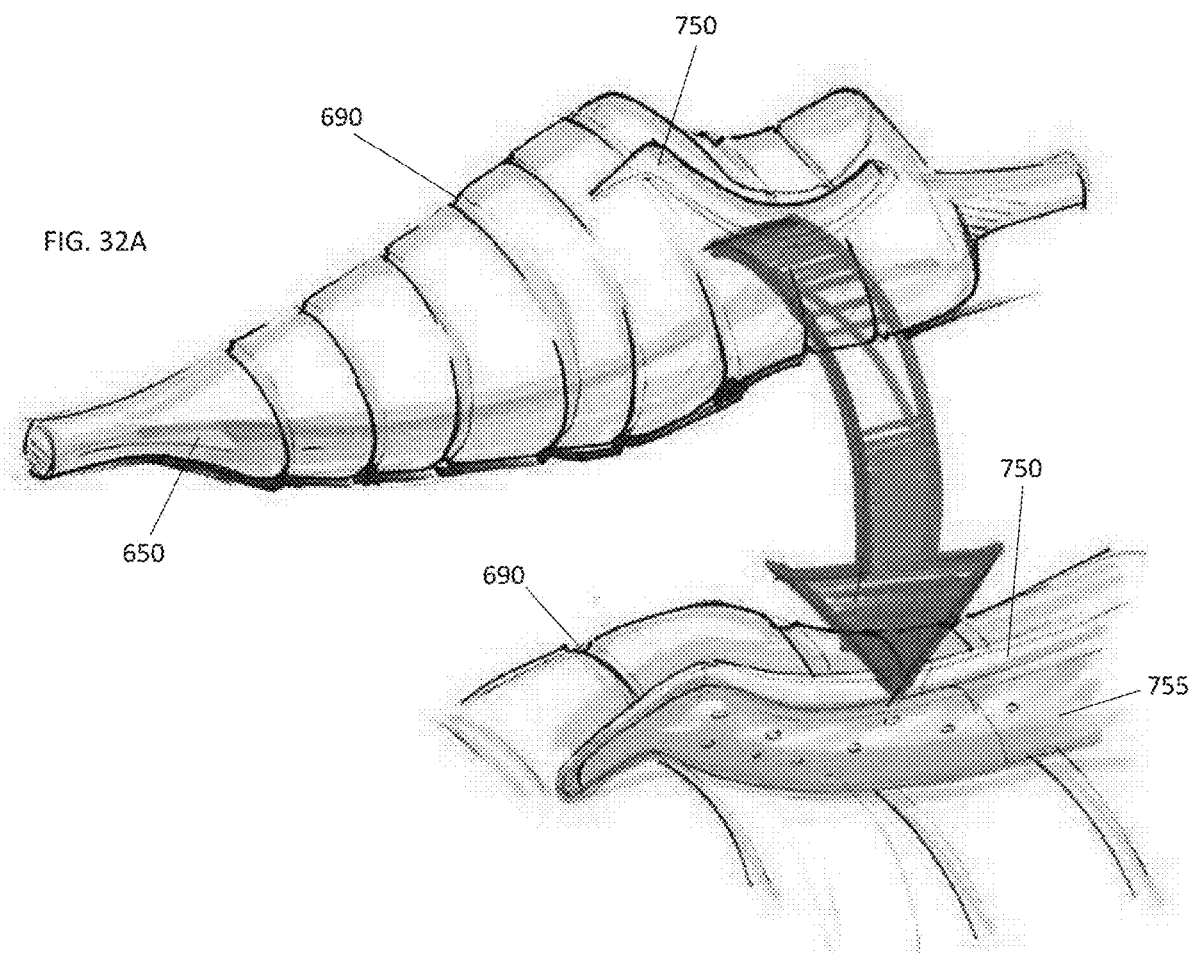
FIG. 32A
FIG. 32B
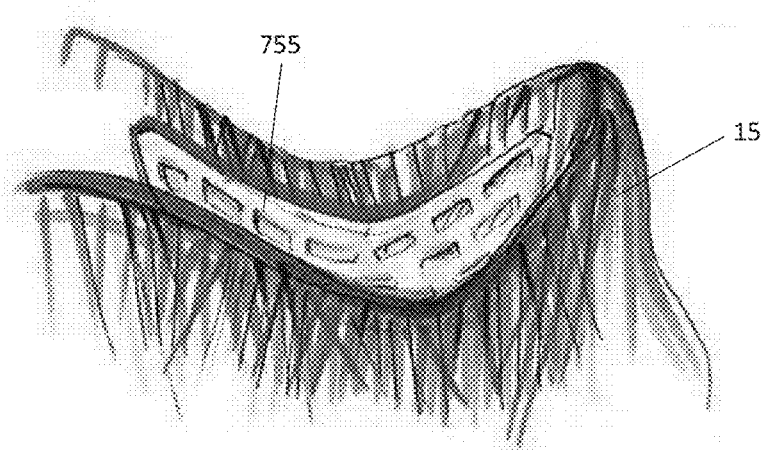
FIG. 32C

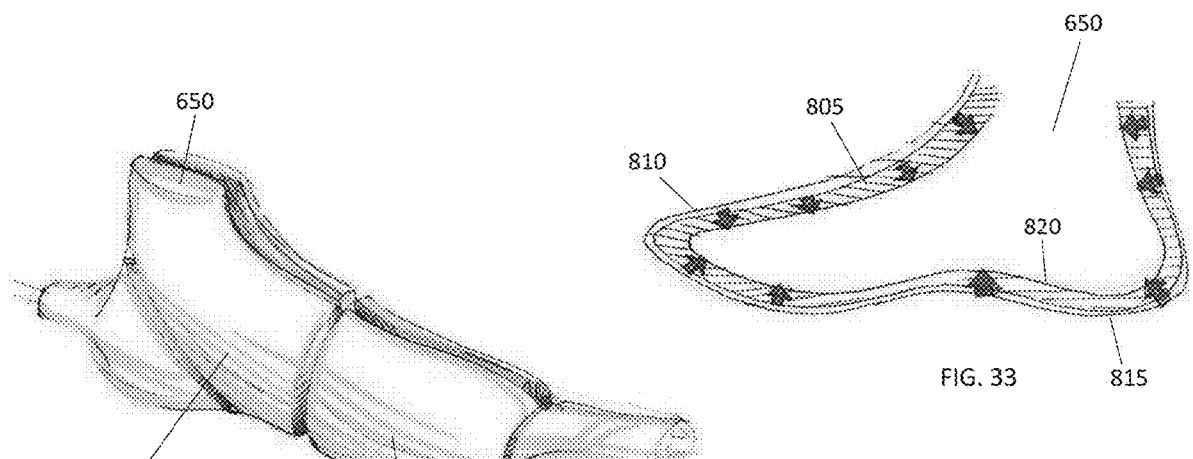
FIG. 33
FIG. 34
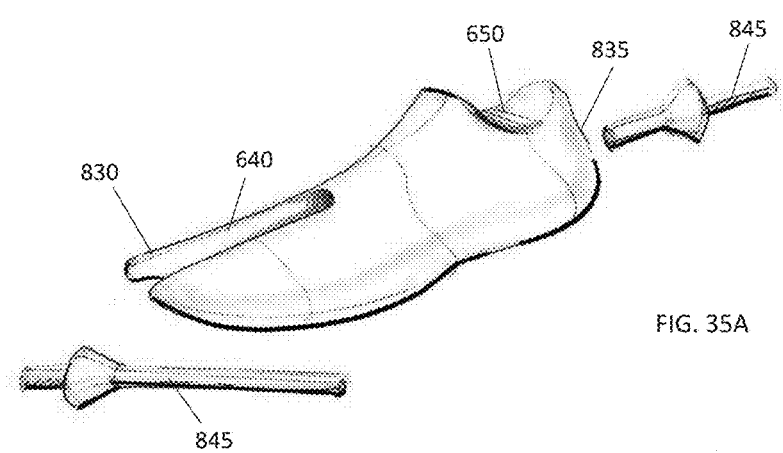
FIG. 35A
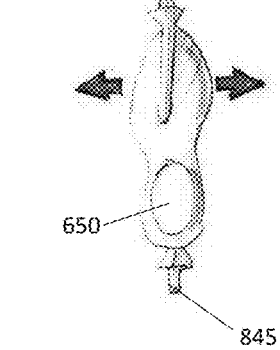
FIG. 35B
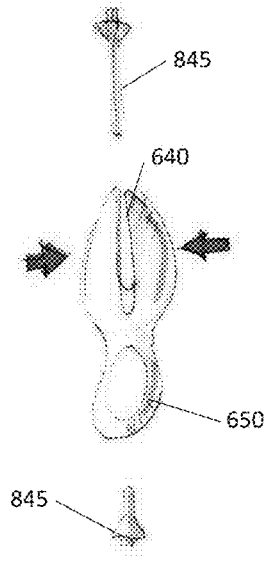
FIG. 35C

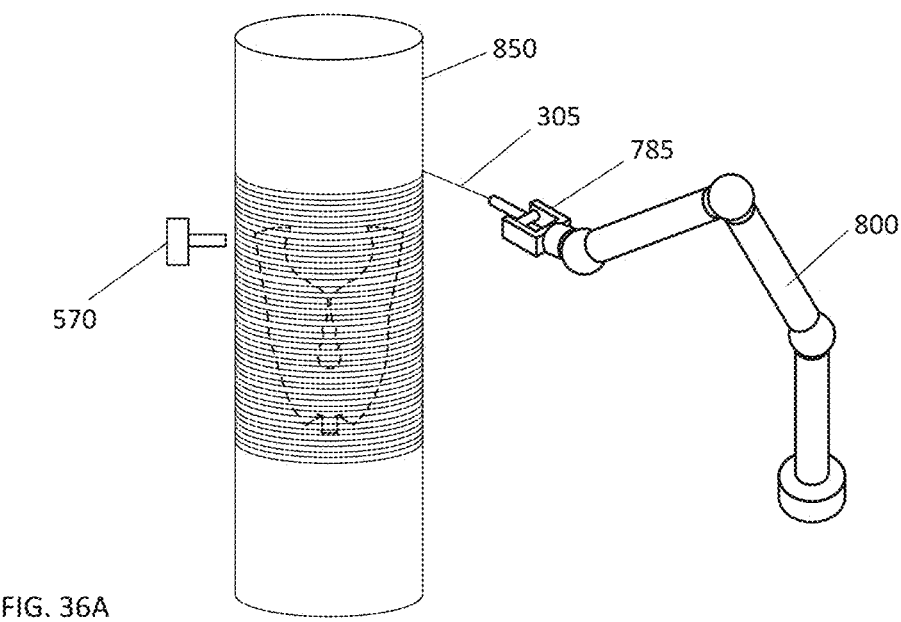
FIG. 36A
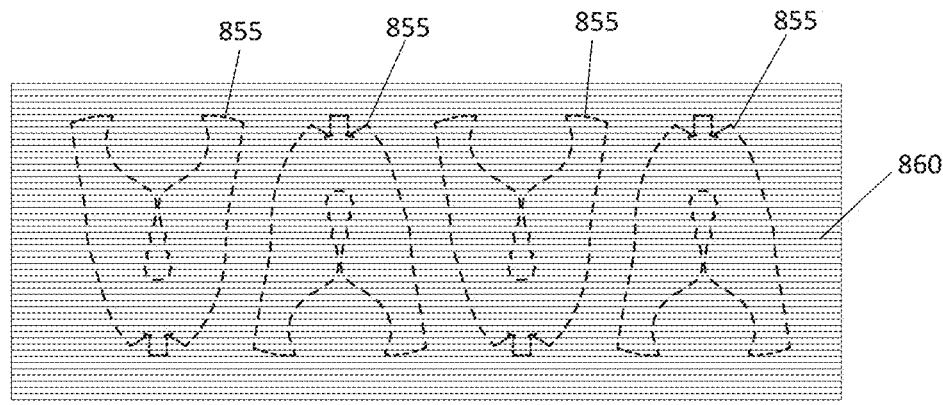
FIG. 36B
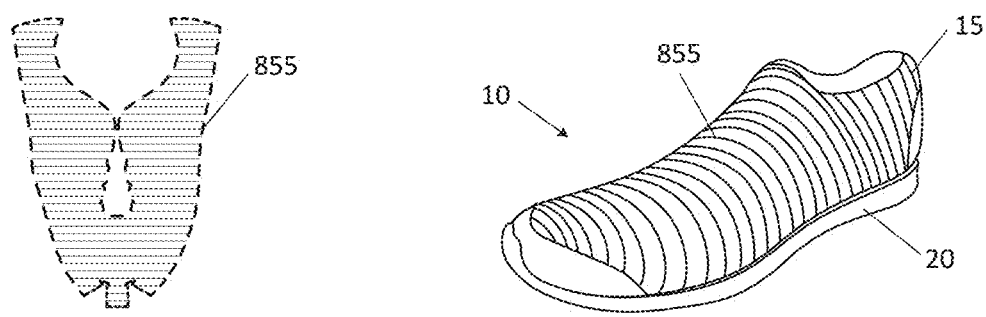
FIG. 36C
FIG. 36D

ARTICLE OF FOOTWEAR INCORPORATING WOUND ELEMENT, AND RELATED METHODS OF MANUFACTURE

CROSS-REFERENCE TO RELATED APPLICATIONS

This application claims priority to and the benefit of U.S. Provisional Patent Application Ser. No. 62/477,163, filed Mar. 27, 2017, the disclosure of which is incorporated herein by reference in its entirety.

FIELD OF THE INVENTION

The present invention relates generally to the field of footwear and, more particularly, to at least a portion of an article of footwear incorporating wound portions, and systems and methods for manufacture of such wound portions. The wound portions may be beneficial, for example, in creating selective regions of support and elasticity in a shoe upper, or portions thereof.

BACKGROUND OF THE INVENTION

The incorporation of materials having different structural properties in different regions of a fabric can be important in a number of industries and products. For example, footwear, and more particularly athletic footwear, includes uppers with different stretch and support characteristics required in different regions of the upper. Traditionally, uppers for athletic footwear are formed from multiple different material portions, with those portions being placed in different regions of the upper of the footwear, or layered over each other in certain regions of the footwear, to provide the desired structural and performance characteristics for the shoe. Forming footwear from these multiple material portions can, however, be both labor intensive and expensive, while also potentially adding weight and other negative physical limitations to the structure and performance capabilities of the footwear. In addition, the structural features and benefits available on the finished shoe can be limited when applying structural features on flat fabric structures that must thereafter be reshaped into a three dimensional shape to form the shoe.

SUMMARY OF THE INVENTION

Given the complexity and cost associated with the formation of fabric elements having complex and varied structural properties through traditional methods, it is desirable to provide improved methods and treatments for standard fabrics that allow for the provision of complex structural and/or decorative features on the footwear through improved and, in certain embodiments, automated and/or customizable, methods and systems. Accordingly, the systems and methods described herein provide innovative methods for creating unique structural and aesthetic features on and in fabric elements for use, for example, in the formation of uppers for articles of footwear.

A first aspect of the invention includes a method of manufacturing at least a portion of an upper for an article of footwear. The method includes the steps of providing a support structure, providing a fiber delivery system, tacking a first end of a first fiber onto the support structure, moving at least one of the support structure and the fiber delivery system with respect to each other to wind the first fiber around the support structure, cutting a second end of the first fiber upon positioning of the first fiber onto the support structure, and treating at least a portion of the first fiber to fixedly hold it in a wound arrangement and form a fabric layer for incorporation into an article of footwear. In one embodiment, the method further includes placing one or more base material over the support structure such that the first fiber is tacked to, and wound onto, the base material. In certain embodiments one or more covering material can be placed over at least a portion of the wound fiber. Treating the first fiber can include, or consist essentially of, applying energy to the first fiber while the first fiber is being wound around the support structure to at least partially fuse the first fiber to the base material over which the first fiber is wound.

The support structure may include, or consist essentially of, a shoe last, or a portion thereof. The fiber delivery system can include an end effector adapted to controllably unspool a spool of one or more fiber onto a surface. The fiber delivery system can also include at least one cutter for cutting the fiber and/or at least one energy producing element for treating the fiber. The energy producing element can include a heating element adapted to heat the first fiber to a temperature sufficient to at least partially melt the first fiber.

In one embodiment, moving the support structure includes rotating the support structure with respect to the fiber delivery system around at least a first axis of rotation associated with the support structure. Alternatively, or in addition, moving the support structure with respect to the fiber delivery system can include rotating the fiber delivery system around at least a first axis of rotation associated with the support structure.

Treating the first fiber can include applying energy to the first fiber to at least partially fuse the first fiber to at least one of an adjacent first fiber portion and a base material over which the first fiber is laid. The first fiber can be formed from at least one of a thread, a filament, a cord, a lace, a ribbon, a tape, and/or a band. In one embodiment, at least one second fiber can be wound around the support structure simultaneously with, or after, winding the first fiber around the support structure. The second fiber can be the same material as the first fiber or can have at least one different structural property and/or different aesthetic property (e.g., different color and/or texture) to the first fiber.

In one embodiment, moving the support structure with respect to the fiber delivery system to wind a first fiber around the support structure includes laying at least a portion of the fiber over the support structure in a crossing configuration. In one embodiment, at least a portion of the first fiber is wound around the support structure in a direction parallel to, or at least substantially parallel to, at least one predominant direction of stress which the finished article of footwear will be subjected to during athletic activity. The wound first fiber can be positioned in a forefoot portion, a midfoot portion, and/or a heel portion of the article of footwear. The first end of the first fiber and/or the second end of the first fiber can be positioned in an underfoot portion of the article of footwear, so it is hidden from view in the finished shoe. The first fiber can be wound around the support structure in a plurality of winds. At least a portion of two adjacent winds of the first fiber may be substantially parallel and/or at least a portion of two adjacent winds of the first fiber can cross.

Another aspect of the invention includes an article of footwear manufactured according to the methods described herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described.

FIGS. 26A through 27B are views of multi-degree-of-freedom robotic systems for use in forming a wound material portion for an article of footwear, in accordance with some embodiments of the invention;

FIGS. 28A through 35C are views of exemplary lasts, and associated elements, for use in forming a wound material portion for an article of footwear, in accordance with some embodiments of the invention;

FIGS. 36A through 36D are views of another method of forming a shoe including a wound material portion, in accordance with some embodiments of the invention;

FIGS. 42A through 42K show an exemplary wind path for winding a wound element to a base material, in accordance with some embodiments of the invention.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

DETAILED DESCRIPTION

The invention described herein relates in general to methods and systems for creating wound portions of shoes and other structures and, in one embodiment, forming at least a portion of an upper for an athletic shoe from a wound fiber structure. Creating material portions at least in part from a wound material allows for the selective positioning of structural support elements in the upper to improve the performance of the upper without adding unnecessary weight. The systems and methods described herein can utilize performance data specific to a sport or article of footwear to create uppers specifically adapted and customized for a specific sport, and even a specific athlete. In addition, the systems and methods described herein can be automated to produce fully formed shoe uppers with minimal labor and a high degree of repeatability and quality.

Figure 1:
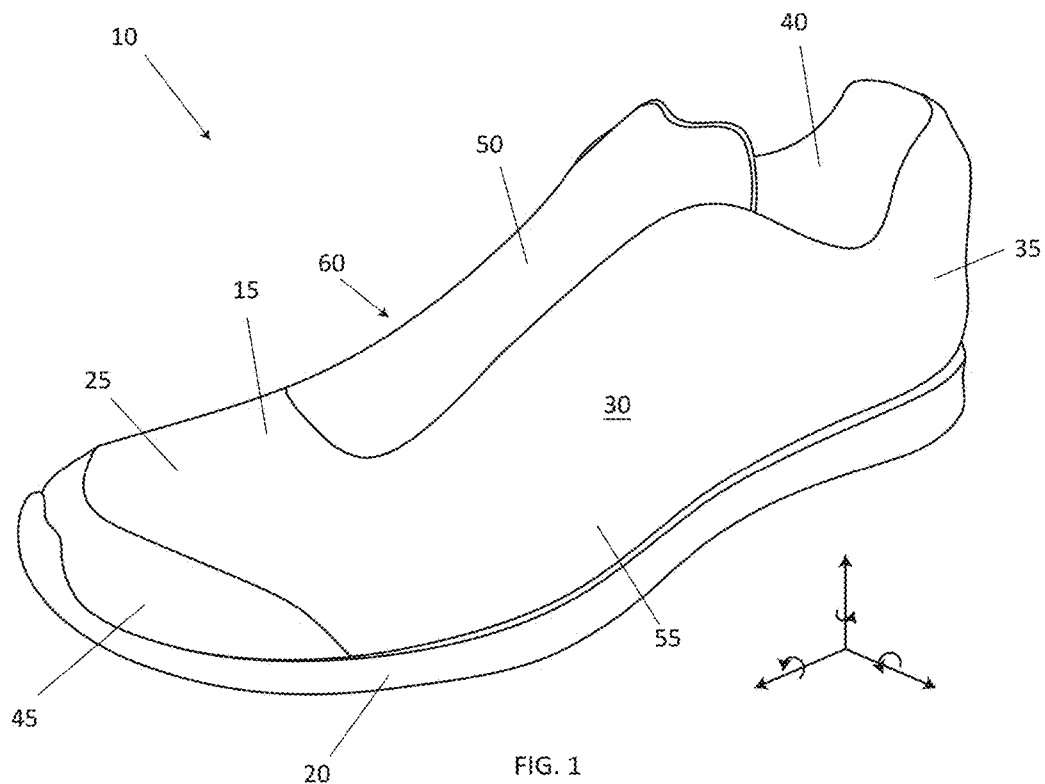
FIG. 1 is a perspective view of an article of footwear, in accordance with some embodiments of the invention.
Figure 2:
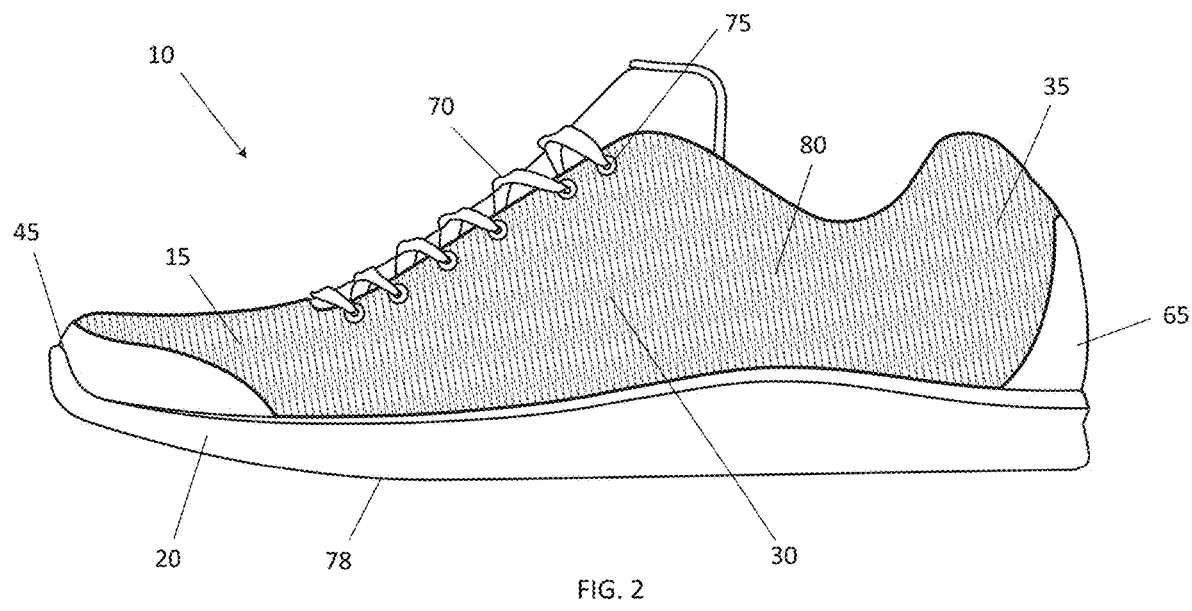
FIG. 2 is a side view of an article of footwear incorporating a wound upper region, in accordance with some embodiments of the invention.

FIGS. 1 and 2 show a shoe 10 having an upper 15 and a sole 20. The shoe has a forefoot region 25, a midfoot region 30, a heel region 35, and a foot opening 40. The shoe 10 further includes a toe cap 45 in the forefoot region 25 of the upper 15 proximate the sole 20 and a tongue portion 50 in the midfoot region 30 proximate the foot opening 40. The shoe also includes a lateral side 55 (corresponding to the outer side of the foot of a wearer) and a medial side 60 (corresponding to an inner side of the foot of a wearer). The shoe 10 of FIG. 2 further shows a heel counter 65 to provide structural support to the heel region 35 of the shoe.

The shoe 10 of FIG. 2 includes a closure system including a lacing element 70 extending through a plurality of lace holes 75. In alternative embodiments any appropriate shoe closure system may be utilized such as, but not limited to, a hook and loop closure system, a strap-type closure system, or any other appropriate footwear closure system as known in the art. In one embodiment, the upper 15 may be a slip-on construction and may, for example include a bootie-type construction that extends elastically over the top of the midfoot of a wearer in the midfoot region 30 of the shoe to hold the foot within the shoe without the need for a separate closure system.

The sole 20 can include a midsole having an upper surface facing towards an interior of the shoe and a lower surface facing towards the ground when the shoe is in contact with the ground. In certain embodiments the sole can include additional elements such as, but not limited to, insole elements, stability structures, and/or cleats, spikes, or other traction elements. Materials used for the soles, and sole elements, described herein may include, but are not limited to, polymeric material which may include, or consist essentially of, polymers, elastomers, and/or thermoplastics. For example, the polymeric material may be ethylene vinyl acetate (EVA), EVA copolymers, polyethylene (PE), chlorinated polyethylene (CPE), polyurethane (PU), thermoplastic polyurethane (TPU), thermoplastic ionomer resin (e.g., DuPont™ Surlyn®), blown rubber, or thermoplastic rubber (TPR). In one embodiment, the midsole can be formed from a material (e.g., a ground contact EVA) having appropriate performance, traction, wear, and durability characteristics to allow it to be used as the ground-contacting surface of a shoe sole. In an alternative embodiment, one or more outsole elements (e.g., a rubber outsole element) may be attached to the lower surface 78 of the midsole, or portions thereof, to provide the appropriate ground contacting characteristics for the shoe 10.

In one embodiment of the invention, the upper 15, or a portion thereof, can be formed at least in part from one or more fibers (e.g., threads, filaments, cords, lace, ribbon, tape, band, or other elongate elements) that are wound about a shoe last or other support element to form at least a portion of the upper 15 of the shoe 10. The fibers may be monofilament or multi-filament structures, and can, for example, be formed as woven, braided, or wound multi-element structures. The fiber, or fibers can be applied through automated tape laying ("ATL"), automated fiber placement ("AFP"), in-situ consolidation, or other appropriate fiber or tape laying techniques. The wound region 80, or regions, may form all or a majority of the upper 15, or may form one or more localized regions of the upper 15. For example, the shoe 10 of FIG. 2 includes an upper 15 made substantially entirely of a wound material region 80, with the toe cap 45 and heel counter 65 providing additional support in the forefoot region 25 and heel region 35 respectively.

The wound upper 15, or the wound upper regions 80, can be formed in a number of ways. In one embodiment, a flexible elongate element (e.g., a fiber) can be wound over a structural support element (e.g., a shoe last, or a portion thereof) to form a wound material on the structural support element. The wound material can be wound onto the structural support element in a uniform, or substantially uniform, direction to form the wound material as a plurality of parallel, or substantially parallel, fibers. These parallel fibers can then be fused, bonded, stitched, or otherwise connected to form a stable structure for use in an upper of an article of footwear. Alternatively, or in addition, the fibers can be wound onto the support structure in a crossing and/or interlocking manner to form the upper material fabric portion, with that crossing/interlocking fabric portion either fused, bonded, stitched, or otherwise permanently connected to form the finished part. The fibers may be laid in substantially linear arrangements, or incorporate curved portions and/or sharp angled portions, depending on the structural performance characteristics and/or aesthetics required.

Alternatively, the fibers can be left unfused (either locally or globally) such that the fabric crossing/interlocking provides sufficient structural stability to hold the finished fabric together. For example, fibers having high surface friction characteristics can be selected to provide a degree of structural stability between adjacent fiber portions, with the degree of friction between fiber portions controlling the extent to which the fibers move with respect to each other during use. In one embodiment, a fiber having a relatively low surface friction characteristic could be used to allow adjacent fibers to move with respect to each other. This may be useful, for example, in embodiments where a high degree of flexibility and/or breathability in an upper is required. In one embodiment, the fibers are held in place along their bottom extent by the sole of the shoe, with the fiber portions forming the upper either entirely separate from each other or locally tacked to each other in discrete locations over the extent of the upper.

In one embodiment, one or more base material layers can be placed over the structural support element prior to winding the fiber onto the structural support element, such that the fiber is wound over the base material to provide structural support to the base material and/or provide an aesthetic design on the surface of the base material. For example, a fabric bootie-type, or sock-type, shoe upper can be placed onto a shoe last with the fiber thereafter wound over the bootie to provide localized directional support to the finished bootie. In various embodiments, the material for the base layer may include, or consist essentially of, a textile or other fabric such as a knit material, a woven material, a non-woven material, a skrim, or any other appropriate fabric material. Alternatively, the base layer can be formed from a film or sheet (e.g., a TPU film) or any other material capable of providing structural stability to the wound fibers. In certain embodiments, the base material can be formed from multiple layers of material. The base layer, or layers, can be made of materials such as, but not limited to, a polyester, a nylon, a spandex or other elastic material, a natural fiber (e.g., cotton or wool), a leather, a blend thereof, a thermoplastic polyurethane (TPU) or any other appropriate material for use in the construction of footwear uppers. In certain embodiments, a layer of material can be positioned over the wound layer, or a portion thereof, in addition to, or in place of, a base layer under the wound portion. The covering layer, or layers, can be formed of a transparent or an opaque material (which may be the same as, or different to, the base layer material), depending on whether it is desired for the wound fibers to be visible below the covering layer.

In various embodiments, the fibers used to create the wound fabric portions can be carefully selected to provide the appropriate level of support, stretch, stiffness, and stability to the shoe upper, with the choice of fiber material (or materials), the thickness of the fiber, the structure of the fiber (e.g., a monofilament-type fiber, a multi-filament fiber, a coated fiber, etc.), the orientation (or orientations) of the fiber on the support structure and/or the treatment of the fiber after winding allowing for a broad range of structural and aesthetic options for use in the resulting fabric. Exemplary materials that can be used as the fiber include, but are not limited to, natural fibers, thermoplastics (e.g., TPU, polyester, etc.), hot melt tape, woven threads, and/or adhesive tape (such as adhesive seam tape provided by Bemis Associates, Inc. of Shirley, Mass., U.S.A.).

Figure 3A:
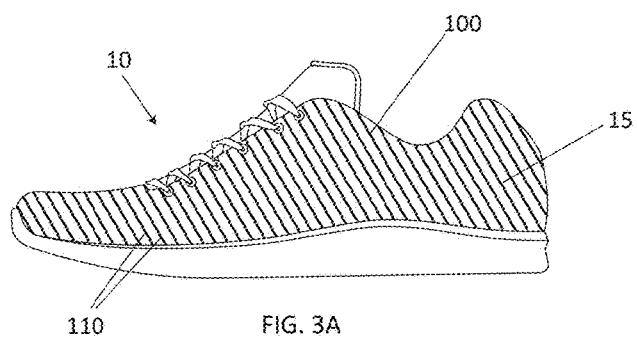
FIGS. 3A through 3F are side views of other articles of footwear incorporating a wound upper region, in accordance with some embodiments of the invention.
Figure 3B:
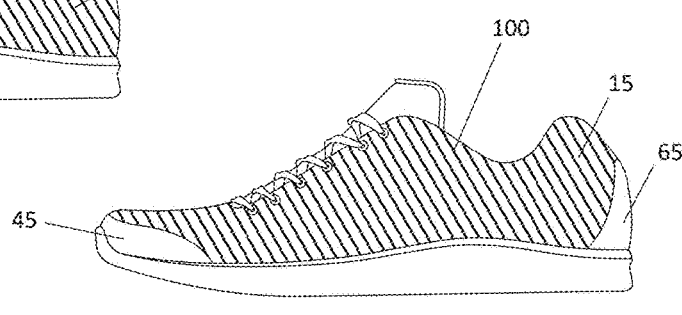

A number of exemplary shoes incorporating wound fibers can be seen in FIGS. 3A to 3F. FIG. 3A shows a shoe 10 including a fiber 100 extending as a plurality of parallel bands 110 over the full length of the shoe 10. The orientation (i.e., the angle of the bands with respect to the longitudinal and transverse axes of the shoe) of the bands is consistent over the length of the shoe 10. In an alternative embodiment, the orientation of the bands may differ in different portions of the shoe 10. FIG. 3B shows a similar shoe 10 to the embodiment of FIG. 3A but with a toe cap 45 and heel counter 65 extending over the wound material in the toe and heel regions respectively.

Figure 3C:
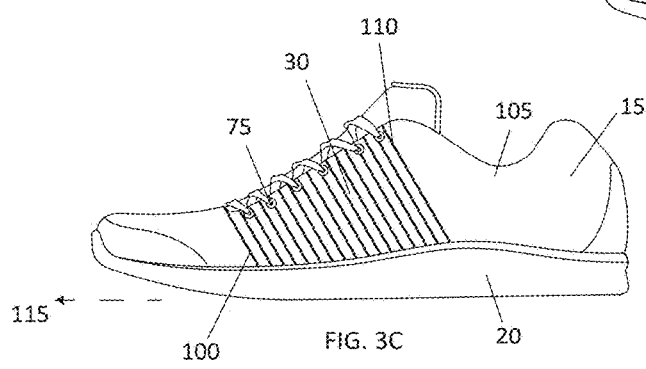
Figure 3D:
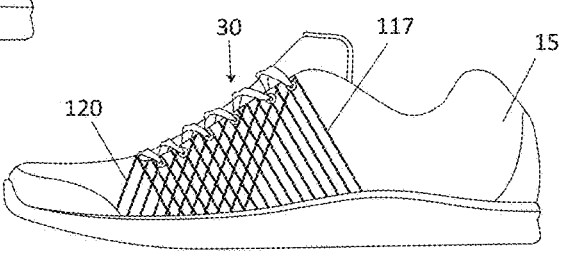

FIGS. 3C and 3D show a shoe 10 having a base material 105 onto which a fiber 100 is wound in a midfoot (or saddle) region 30 to only provide additional structural support in that region 30 without affecting the structural properties of the remainder of the shoe 10. The fibers 100 extend from the region proximate the lace holes 75 down to the sole 20 in the midfoot region 30 to reduce the stretch of the upper 15 in that region and thereby provide additional support and fit when laced. In the embodiment of FIG. 3C, all the bands 110 of wound fiber 100 extend in the same direction, at an acute angle of approximately 60° to the horizontal longitudinal plane 115 of the shoe 10 (i.e., equivalent to the floor). By orienting the bands 110 in a parallel, aligned, arrangement, the wound portion creates increased support, and reduced stretch, in a direction parallel with the longitudinal direction of the bands, without reducing the flexibility and elasticity of the upper 15 in a direction perpendicular to the longitudinal direction of the bands to the same extent.

The extent to which the bands 110 reduce the elasticity of the upper 15 in directions other than parallel to the longitudinal direction of the bands 110 can be controlled, for example, by controlling the density of the aligned parallel bands 110 and the nature of the bond between the bands 110 and the base material 105. For example, spacing adjacent bands 110 apart from one another allows the underlying base material 105 to stretch in the regions between bands 110, whereas placing adjacent bands 110 in an abutting arrangement would prevent, or substantially prevent, the base material 105 in the wound region from stretching more than the bands 110.

In the embodiment of FIG. 3D, the upper 15 includes a first set 117 of bands extending at a first angle (in this case approximately 60° to the horizontal longitudinal plane of the shoe) and a second set 120 of bands extending at a second angle (in this case approximately 110° to the horizontal longitudinal plane of the shoe) within the midfoot region 30. Incorporating multiple sets of overlapping and/or adjacent bands extending in different directions allows the wound region to support the stretch and stability of the shoe 10 in multiple directions. In an alternative embodiment, as shown in FIG. 3F, the upper 15 includes a first set 117 of bands extending at a first angle in the midfoot region 30 and a second set 130 of bands extending at a second angle in the heel region 35. Further embodiments of the invention can include one or more layers of bands extending in different regions in any region, or regions, of the shoe 10.

Figure 3E:
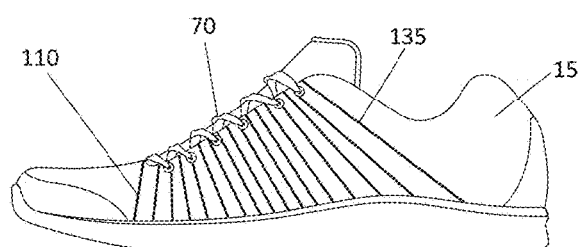
Figure 3F:
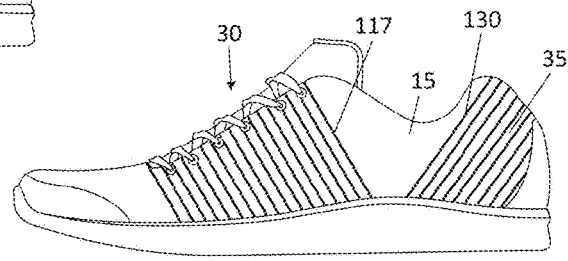

In the embodiment of FIG. 3E, the upper 15 includes a first set 135 of bands that vary in their angle of alignment, with each band 110 extending at a different angle over the upper 15 to their adjacent bands 110. In the embodiment of FIG. 3E, the bands 110 extend in a radiating arrangement from the lace portion 70 of the upper 15 within the midfoot region 30 of the shoe 10. In alternative arrangements each band 110 can extend around the upper 15, or a portion thereof, at any required angle with respect to the previous band 110 laid down such that a plurality of complex winding patterns can be created in appropriate regions of the shoe 10.

Figure 4:
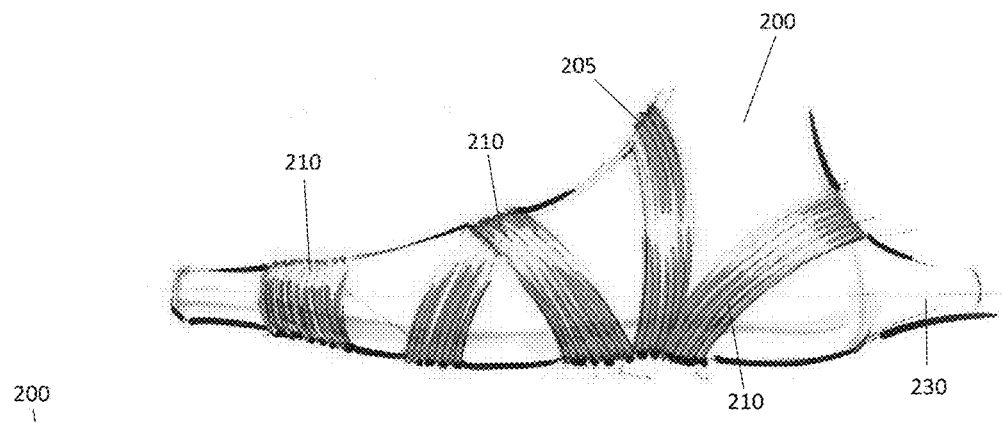
FIG. 4 is a side view of an upper for another article of footwear incorporating a wound upper region, in accordance with some embodiments of the invention.
Figure 5:
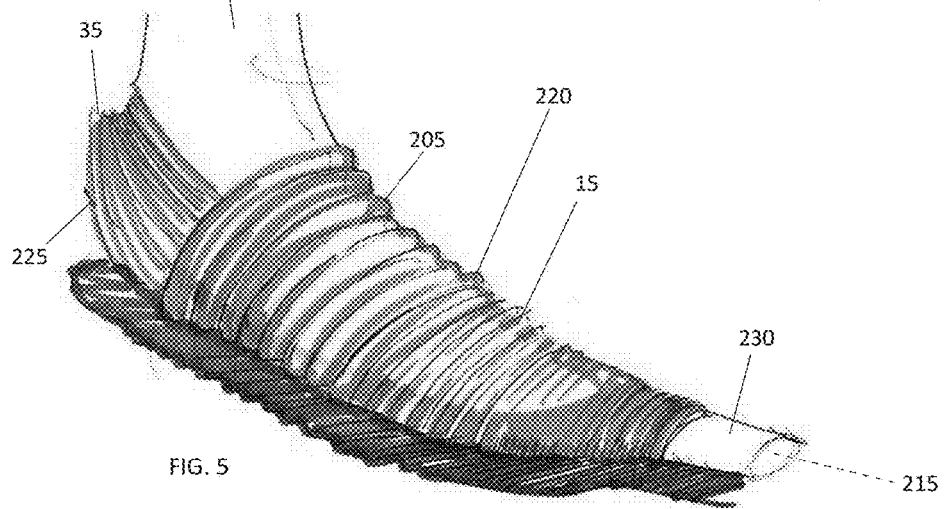
FIG. 5 is a perspective view of an upper for another article of footwear incorporating a wound upper region, in accordance with some embodiments of the invention.

In certain embodiments of the invention no base material is required, with one or more fibers being wound directly onto a last or other structure to create the footwear. FIG. 4, for example, shows a last 200 onto which a fiber 205 is wound to form a plurality of strap portions 210 (each strap portion 210 having a plurality of adjacent fibers 205 bonded or otherwise connected to each other to form the strap portion 210) forming an open sandal-type upper arrangement. FIG. 5 shows an upper 15 formed entirely from a fiber 205 being wound over a last 200, with the fiber 205 being wound in a direction substantially perpendicular to a longitudinal axis 215 of the last 200 to form a first region 220 in the forefoot and midfoot portions of the upper 15, and with the fiber 205 being wound in a second direction at an acute angle to the longitudinal axis 215 of the last 200 to form a second region 225 in a heel region 35 of the upper 15. Upon removal from the last 200 the resulting wound upper 15 can have a toe cap and heel cap added to the upper 15 to finish the heel and toe portions left open due to the extensions 230 of the last at the toe and heel.

Figure 6:
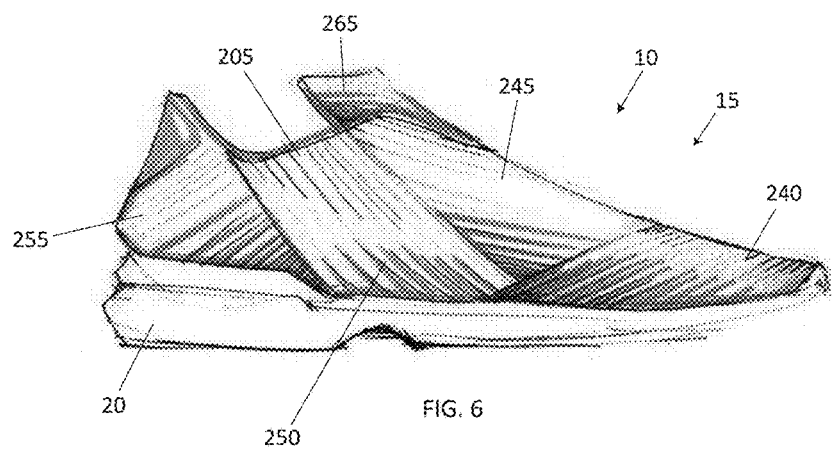
FIG. 6 is a side view of another article of footwear incorporating a wound upper region, in accordance with some embodiments of the invention.

In one embodiment, as shown in FIG. 6, the upper 15 can be formed from a plurality of wound fiber regions extending over different regions of the shoe in different directions and overlapping with each other to form a full, closed upper 15 for a shoe 10. Here, the upper 15 includes a forefoot region 240, a first midfoot region 245, a second midfoot region 250, and a heel region 255. The shoe further includes a sole 20 and a tongue portion 265. Each region includes a plurality of parallel adjacent fibers 205 that are fused or otherwise bonded together to form the upper 15, with the regions bonded together at their overlapping areas. The flexibility and support provided by the shoe is controlled by factors including, but not limited to, the orientation, size, elasticity, density, and degree of bonding of the fibers 205 in a given region.

Other exemplary shoes formed at least in part from wound fibers can be seen in FIGS. 7A through 7F. The shoe of FIG. 7A includes a forefoot region 25 formed from a plurality of overlapping wound regions and a separate heel region 35 formed from a plurality of overlapping wound regions, with a separate material portion 270 (formed from a knit, woven, non-woven, leather, or other material) extending over the midfoot region 30 and separating the forefoot wound portions and heel wound portions.

Figure 7A:
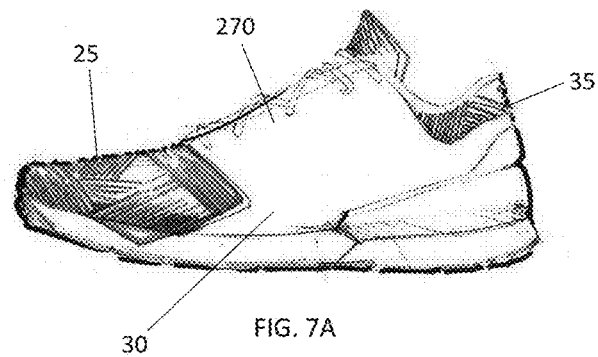
FIGS. 7A through 7F are views of other articles of footwear incorporating a wound upper region, in accordance with some embodiments of the invention.
Figure 7B:
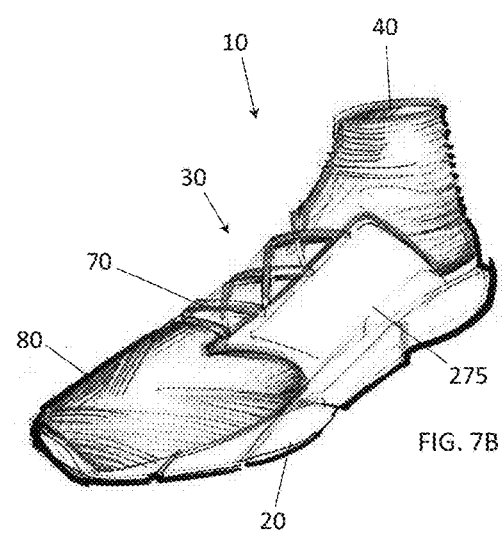

The shoe of FIG. 7B includes a full wound upper 15 with a covering material 275 extending over the wound material 80 in a midfoot region 30 on both the medial and lateral sides and a lacing portion 70 extending between the covering material on the medial and lateral sides to provide a mechanism for tightening the shoe 10 around a foot. The covering portion 275 can extend from the sole unit 20 as an integral material extending up from the sole or be a separate material portion placed over the wound upper 15 and connected to the sole 20 and/or the wound upper material 80.

Figure 7C:
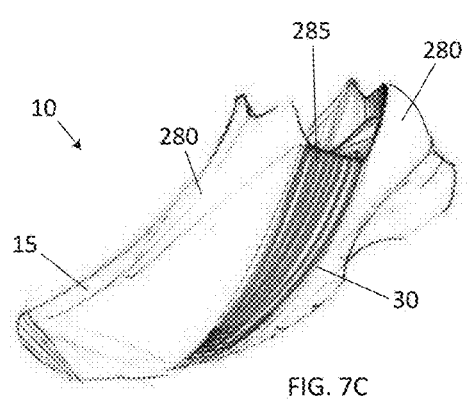

The shoe 10 of FIG. 7C includes an upper 15 formed substantially from one or more base materials 280 (e.g., one or more knit, woven, non-woven, leather, or other material portions) with a wound portion 285 positioned over the base materials to provide additional support in the midfoot region 30. In this embodiment, the wound portion 285 extends on the outside of both the upper 15 and the sole unit 20 and is added to the shoe 10 after the base material 280 and sole 20 have been bonded, cemented, or otherwise connected together.

Figure 7D:
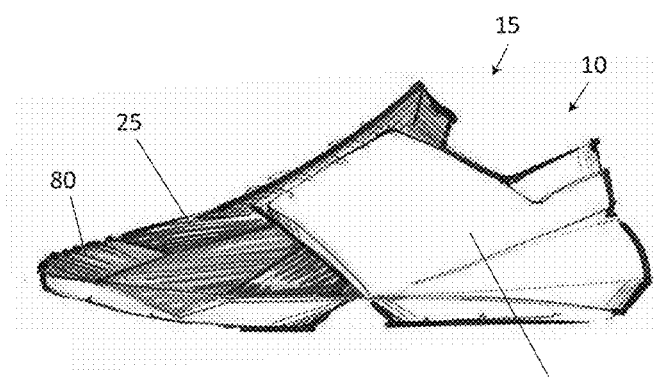

The shoe 10 of FIG. 7D includes an upper 15 having a forefoot region 25 formed from a plurality of overlapping wound regions 80, with each wound region 80 being formed from a fiber of a different color. In various embodiments of the invention, different regions of the upper 15 can be formed from fibers having any combination of different colors, dimensions, and/or structural properties, depending upon the specific performance properties and aesthetics required. In one embodiment, the wound region(s) 80 can be formed from a single fiber that has been dyed or otherwise treated to have a different color at different portions along its length. In an alternative embodiment, different fibers can be used to form the different regions, with each of the different fibers having a selected color (or colors). In a further embodiment, the color can be dyed onto or otherwise applied to the fiber(s) after winding them into a portion of an upper 15.

Figure 7E:
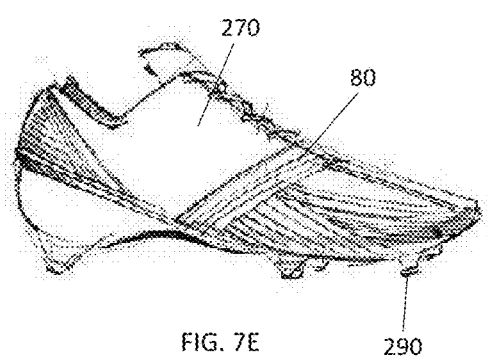
Figure 7F:
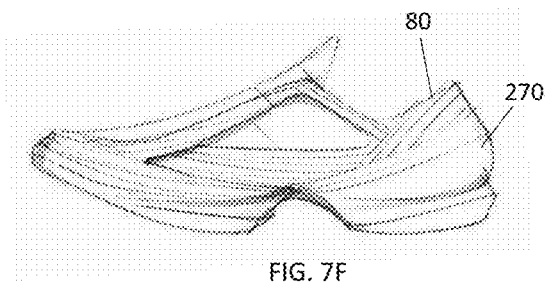

In one embodiment, as shown in FIG. 7E, wound portions 80 can be incorporated into cleated footwear, such as a soccer boot, and can extend around the cleats 290 or extend above a plate onto which the cleats 290 are positioned. In alternative embodiments, other types of athletic footwear, such as track spikes, trail shoes, running shoes, training shoes, etc., can incorporate one or more wound portions. An exemplary running shoe having a plurality of wound portions extending over a base material is shown in FIG. 7F. In further alternative embodiments, other types of footwear, such as safety footwear, fashion footwear, etc., can be formed at least in part from wound structures.

Figure 8:
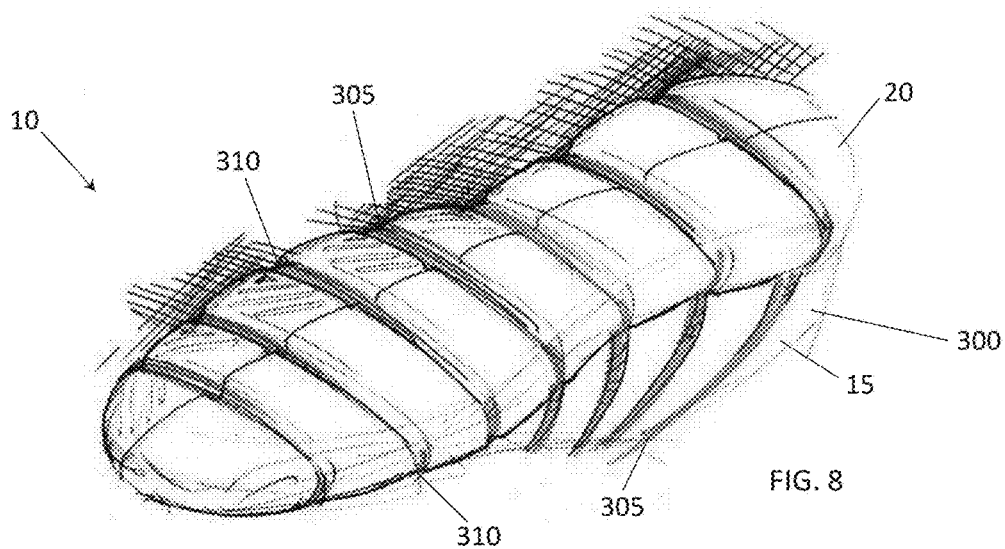
FIG. 8 is a perspective view of an article of footwear incorporating a wound element into the sole and upper, in accordance with some embodiments of the invention.
Figure 10:
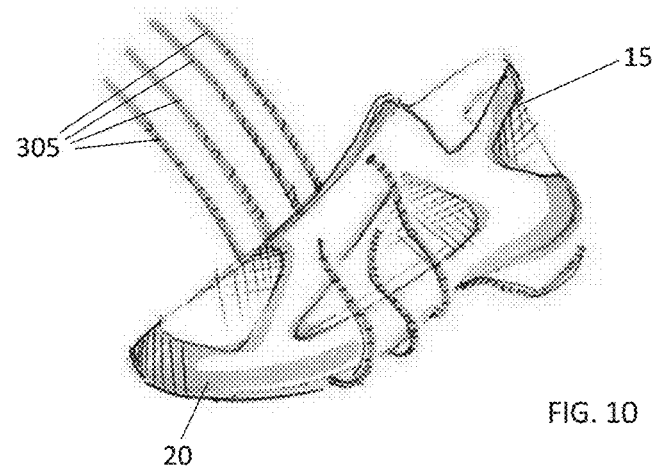
FIG. 10 is a perspective view of a plurality of fibers being wound over an upper and sole of an article of footwear, in accordance with some embodiments of the invention.

In one embodiment of the invention, fibers 305 can be wound around both the upper 15 and the sole 20 of a shoe 10. For example, the shoe 10 shown in FIG. 8 includes a fiber 305 that is repeatedly wound around both an upper base material 300 and a sole element 20 to form a finished shoe 10. Winding the fibers 305 around both the upper 15 and the sole 20 may be beneficial, for example, in fixedly attaching the upper 15 to the sole 20, providing traction elements for the sole, providing enhanced support regions for the shoe 10, and/or providing a unique aesthetic for the shoe 10. As shown in FIG. 8, the sole 20 can be formed with guide elements 310 (in this case guide channels) to hold and support the wound fiber 305. In an alternative embodiment, the sole 20 can be free from guide elements 310. In the embodiment of FIG. 8 a single fiber 305 is used to form the wound support structures for the sole 20 and upper 15 by repeatedly winding this fiber 305 around the shoe 10. In an alternative embodiment, such as the shoe 10 shown in FIG. 10, a plurality of fibers 305 can be wound around a shoe upper 15 and attached sole element 20 to form the finished shoe. More generally, in one embodiment, a single fiber construction is used for the wound region (or regions) 180 of the shoe, while in alternative embodiments, a plurality of different fibers (having different properties and/or colors) can be utilized to form the wound material portion of a shoe upper, with these different fibers being added simultaneously or one after the other and being overlaid in the same regions and/or separately wound on different regions of the shoe.

Figure 9:
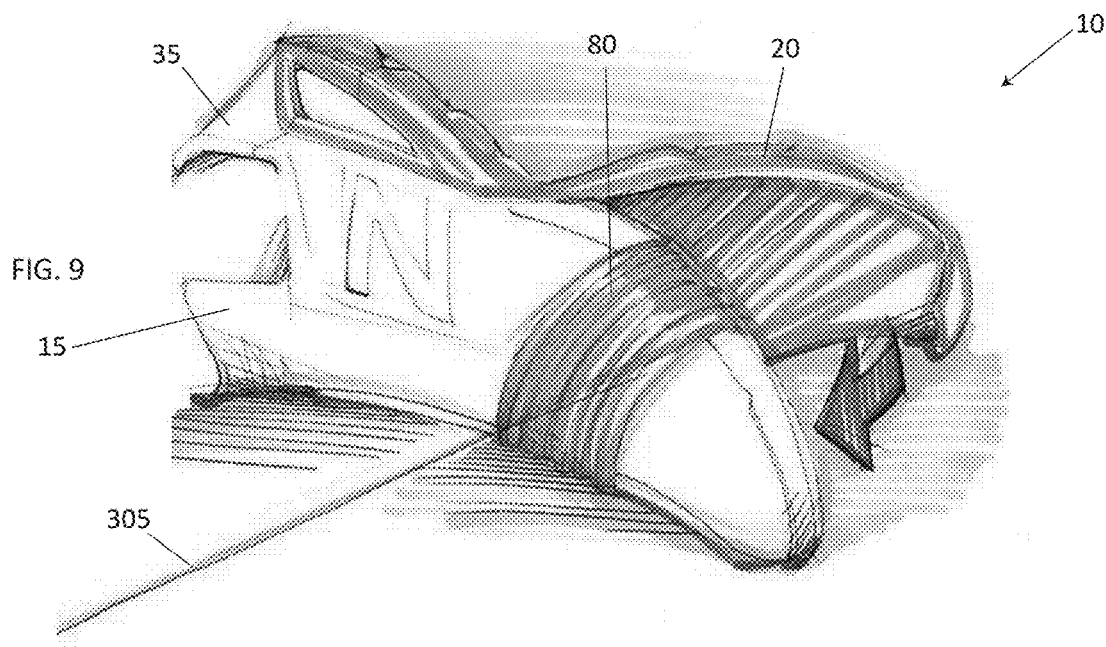
FIG. 9 is a perspective view of a fiber being wound between an upper and a sole of an article of footwear, in accordance with some embodiments of the invention.

In one embodiment, the wound fibers can be wound over a last (and, in some embodiments, one or more base materials placed on the last) to form the upper of a shoe, with a sole thereafter bonded, cemented, fused, or otherwise attached to the upper to form a finished shoe with the wound fibers extending between the upper and the sole. In a further alternative embodiment, as shown in FIG. 9, a sole 20 can be partially bonded to an upper 15 in a first region (the heel region 35 in the embodiment of FIG. 9) prior to winding, with the fiber 305 wound around the shoe 10 in a region where the sole 20 is unattached (and held out of the way), after which the sole 20 is fully bonded to the upper 15 to finish the shoe and hold the wound region 80 in place.

Figure 11A:
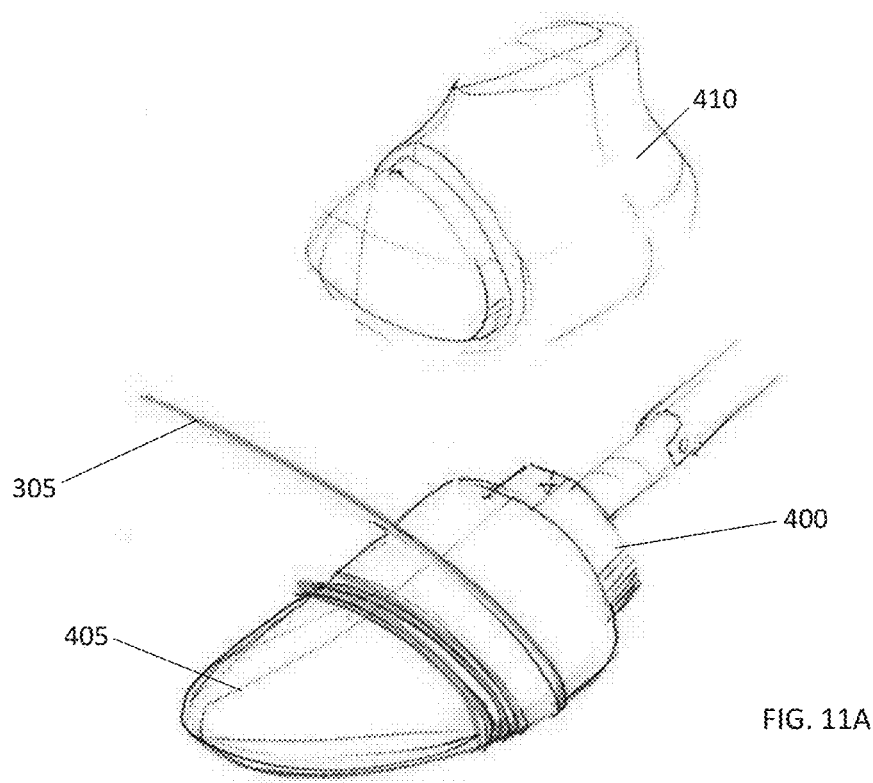
FIG. 11A is a perspective view of a fiber being wound over a shoe last portion, in accordance with some embodiments of the invention.
Figure 11B:
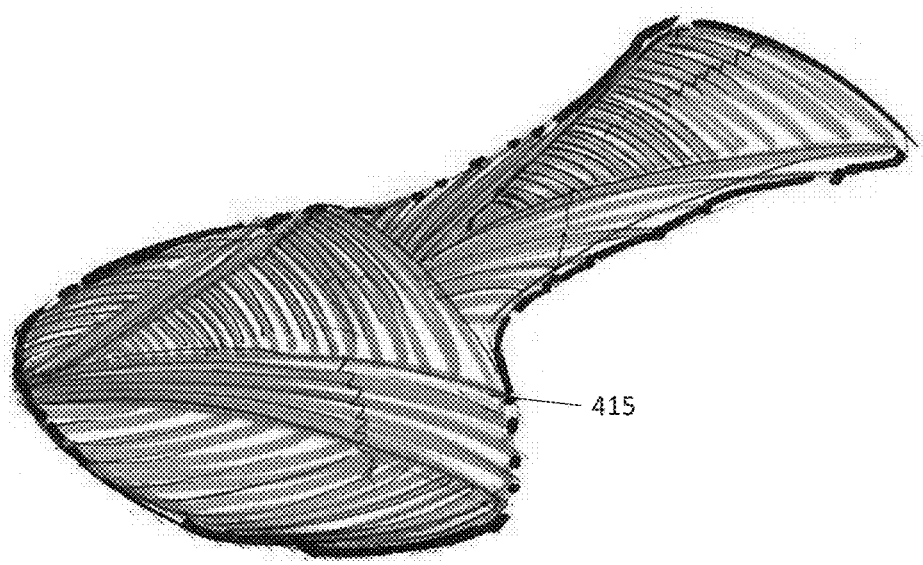
FIG. 11B is a perspective view of a wound tongue for an article of footwear, in accordance with some embodiments of the invention.

In certain embodiments, a shoe can include both wound portions that extend between a sole and an upper and wound portions that extend around both the sole and upper. For example, the wound fibers can extend around both the upper and sole in one or more first regions, while extending between the sole and the upper in other regions In one embodiment of the invention, fibers can be wound around a structural element specifically shaped to create a specific portion of a shoe. For example, FIG. 11A shows a structural element 400 forming a forefoot portion 405 of a shoe upper, with the fibers 305 wound around this region to form a wound forefoot upper portion prior to the structural element 400 being connected to an additional structural element 410 (in this case a heel portion of a last) to allow for additional manufacturing steps to be performed to produce a finished upper. In the example of FIG. 11B the structural element can be shaped, sized, and otherwise configured to allow fibers being wound around it to form a tongue portion 415 of a shoe.

Figure 12A:
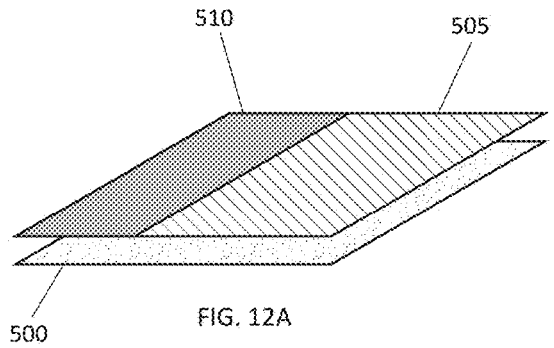
FIGS. 12A and 12B are schematic perspective views of a layered material including a wound portion, in accordance with some embodiments of the invention.
Figure 12B:
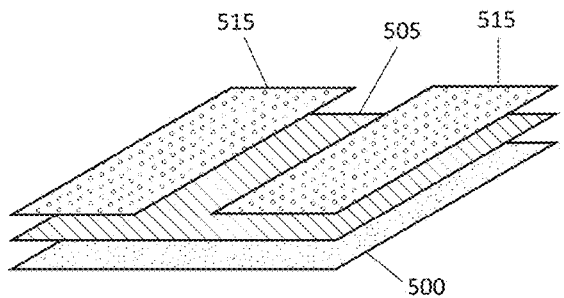

The material portions created through the use of wound fibers can take a number of forms and have a number of layers and arrangements of layers. This can include material portions formed entirely from one or more layers of wound fibers, or material portions formed from one or more materials layers (e.g., one or more base layers and/or covering layers) incorporated with one or more layers of wound fibers. In FIG. 12A, for example, a material portion for incorporation into a shoe upper is formed from a base layer 500 onto which a wound layer portion 505 is positioned, with a non-wound region 510 (e.g., a knit, woven, non-woven, leather, or other fabric material portion) being placed adjacent the wound region 505 to form the outer layer of the material portion. In FIG. 12B, a base layer 500 is positioned below a wound layer 505, with multiple cover layer portions 515 of a non-wound material placed over, and covering, selected portions of the wound layer 505, while other portions of the wound layer 505 are left exposed. In alternative embodiments, the entire wound layer 505 can be covered by one or more covering layers 515.

Figure 13A:
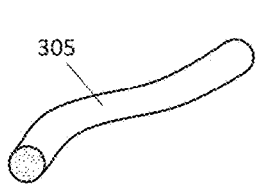
FIGS. 13A through 13C are schematic perspective views of fibers for incorporation into a wound material portion, in accordance with some embodiments of the invention.
Figure 13B:
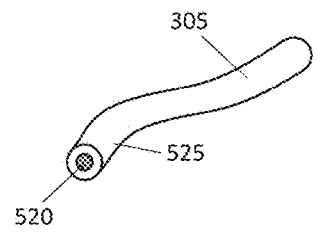
Figure 13C:
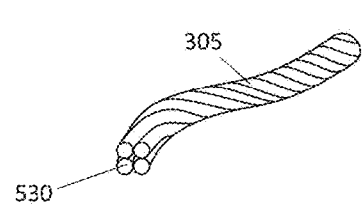

The fibers 305 used to create the wound portions can take any appropriate form. For example, the fiber can be formed from a monofilament or a single material (or blend of materials) as shown in FIG. 13A. Alternatively, the fiber 305 can be formed from two or more layers of material with, for example, an inner core 520 covered by an outer covering layer 525, as shown in FIG. 13B. In this embodiment, the core layer 520 can be used to provide selected structural properties (e.g., stretch, stiffness, etc.) while the outer layer 525 can be a material specifically selected to provide appropriate bonding between adjacent fibers and between the fibers and other adjacent materials in the upper. For example, the outer layer 525 can be a heat-fusible material that can be selectively melted and cooled to bond to adjacent materials upon localized application of heat. In one embodiment, the fiber 305 can be formed from a plurality of wound filaments 530, an example of which is shown in FIG. 13C. In one embodiment, an outer covering layer may be sprayed, coated, or otherwise directed onto the fibrous material in a liquid form which hardens after application.

Figure 14A:
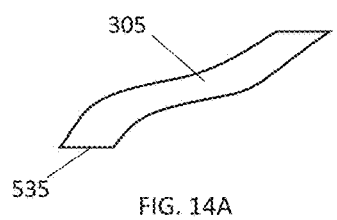
FIGS. 14A and 14B are schematic perspective views of material strips for incorporation into a wound material portion, in accordance with some embodiments of the invention.
Figure 14B:
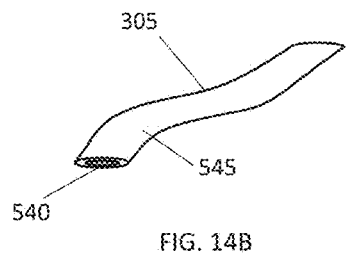
Figure 15A:
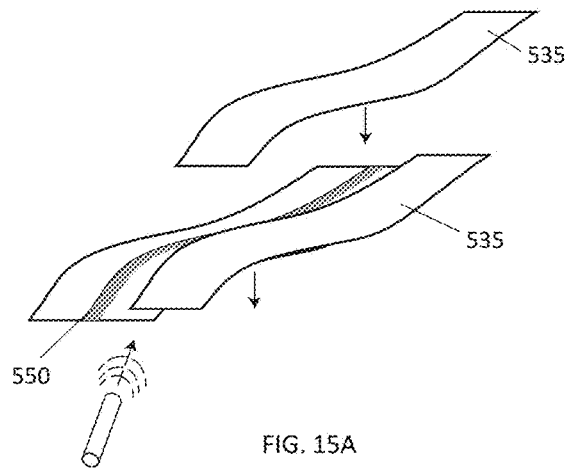
FIGS. 15A and 15B are schematic perspective views of a method of forming a wound material portion from one or more wound strips of material, in accordance with some embodiments of the invention.
Figure 15B:
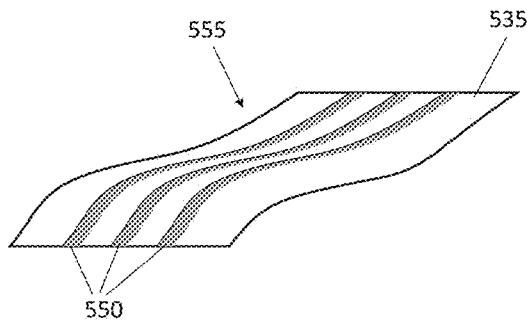
Figure 16A:
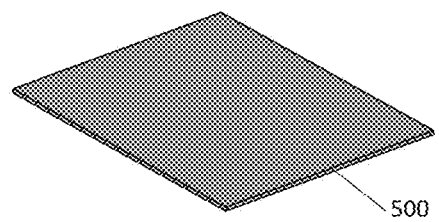
FIGS. 16A through 16D are schematic perspective views of a method of forming a wound material portion, in accordance with some embodiments of the invention.
Figure 16B:
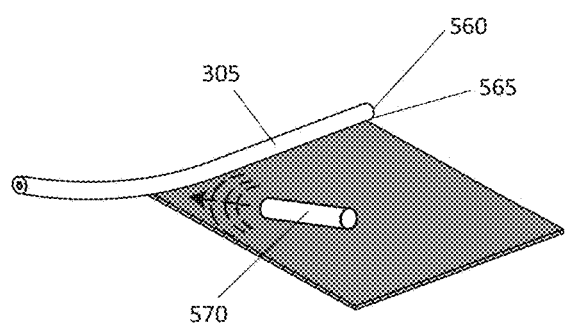
Figure 16C:
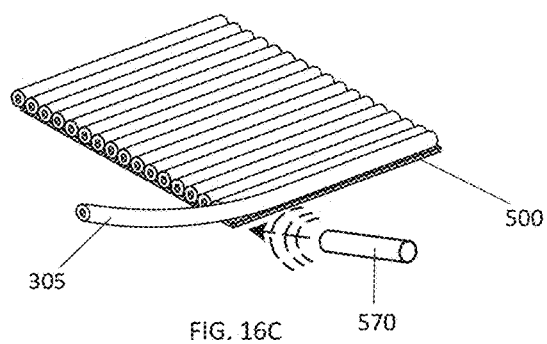
Figure 16D:
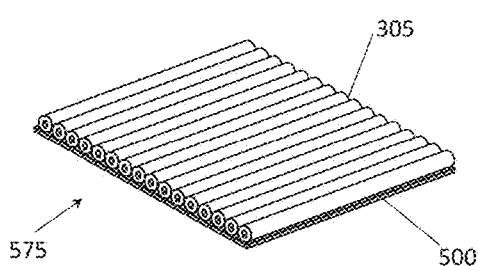

In one embodiment, the fiber 305 can take the form of a ribbon, tape, or other two-dimensional strip of material. This strip can be formed as a unitary strip of material 535, as shown in FIG. 14A, or be formed with an inner structural core 540 and an outer layer 545, as shown in FIG. 14B. These strips 535 can be positioned in an overlapping configuration and thereafter treated at their overlapping regions 550 (e.g., through heating, ultrasonic bonding, etc.) to form a finished sheet 555 of wound material, as shown in FIGS. 15A and 15B. Alternatively, the strips 535 can be arranged in an abutting arrangement or form a plurality of separated bands bonded to a base material.

Exemplary methods of forming a wound material portion are shown in FIGS. 16A through 21C. A first exemplary method of forming a wound material portion is shown in FIGS. 16A through 16D. In this embodiment, the wound material portion includes a base material 500 onto which wound fibers 305 can be attached. A first end 560 of the fiber 305 is tacked onto the base material 500 at a starting location 565, after which the fiber 305 is laid over the base material 500 in a plurality of adjacent strips as the fiber 305 is repeatedly wound around the base material 500 and the support structure on which it is mounted. As the fiber 305 is placed on the base material 500 it is treated by an energy producing element 570 (e.g., through the application of heat, ultrasonic energy, or another source of energy, or alternatively through the application of a glue, cement, or other bonding agent) to fixedly attach the fiber 305 to the base material 500 while leaving the fiber structure and shape substantially intact. As a result, upon completion, the finished material portion 575 has an aesthetic finished look of a number of adjacent parallel fibers, as shown in FIG. 16D.

Figure 17A:
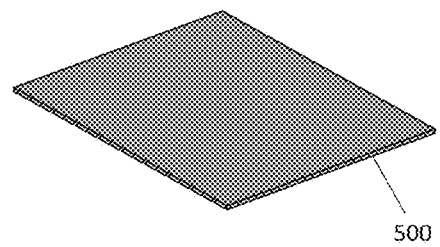
FIGS. 17A through 17D are schematic perspective views of another method of forming a wound material portion, in accordance with some embodiments of the invention.
Figure 17B:
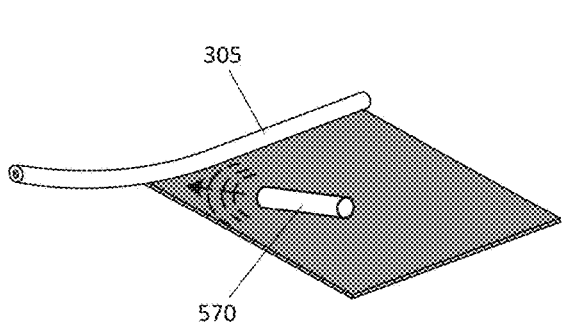
Figure 17C:
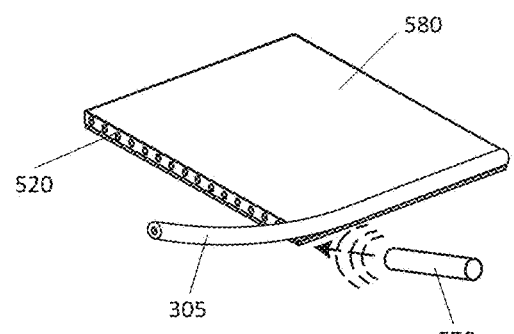
Figure 17D:
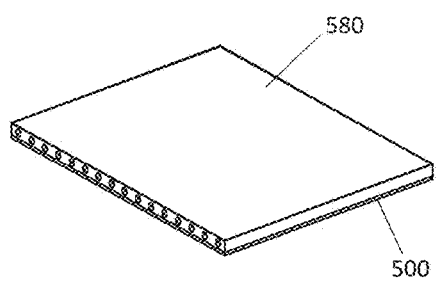

In an alternative embodiment, as shown in FIGS. 17A through 17D, sufficient heat, or other energy, may be applied to the fibers 305 to substantially completely melt the outer covering layer 525 (FIG. 13B) of the fibers such that the outer surface of adjacent fibers bond and blend completely, or substantially completely, with each other to create a smooth outer surface 580 of the wound layer, but with the inner core 520 of each adjacent fiber laying parallel with each other below the surface. As a result, wound fibers can be utilized to create a material structure having a substantially smooth outer surface but with directional support elements (the inner cores of the fiber) hidden and embedded within the material, as shown in FIG. 17D.

Figure 18A:
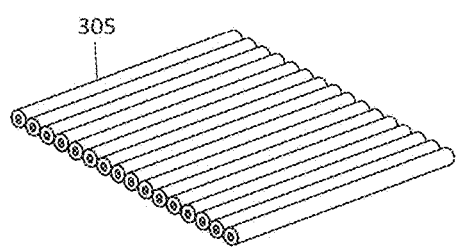
FIGS. 18A through 18C are schematic perspective views of another method of forming a wound material portion, in accordance with some embodiments of the invention.
Figure 18B:
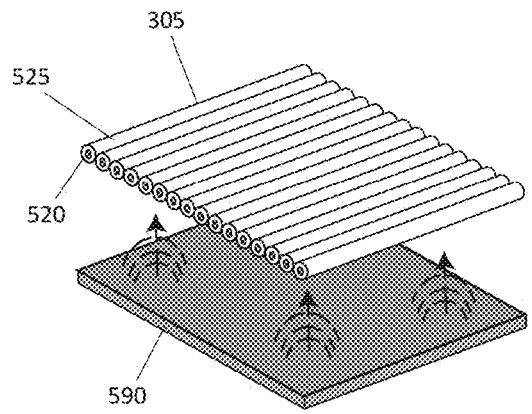
Figure 18C:
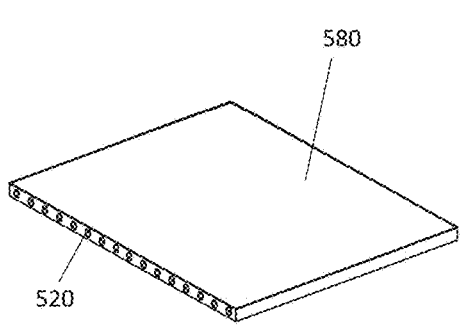

Another method of forming a material structure having a substantially smooth outer surface 580 but with directional support elements hidden and embedded within the material is shown in FIGS. 18A through 18C. In this embodiment, one or more fibers 305 is wound around a support structure to form a wound region having a plurality of adjacent fiber sections, after which heat, or another energy source, is applied globally over the whole wound region to fuse the fibers together to form the finished part without the need for an underlying base layer although, in an alternative embodiment, a base layer may still be incorporated into this structure. The global application of heat can be applied through use of a heat plate 590. Alternatively, the underlying support structure (e.g., a last) onto which the fiber is wound can include one or more surface elements adapted to apply heat to the fibers to fuse them together (and, if necessary, fuse them to one or more base layers) to form the finished part.

In one embodiment, as shown in FIG. 18C, the heat plate can apply sufficient heat and pressure to substantially completely melt the outer covering layer of the fibers such that the outer surface of adjacent fibers bond and blend completely, or substantially completely, with each other to create a smooth outer surface 580 of the wound layer. In an alternative embodiment, the heat plate may only provide sufficient heat and pressure to fuse the adjacent fibers together (and, if necessary fuse them to a base layer) without removing the surface texturing provided by wound fiber(s). In a further embodiment the heat plate may itself have a textured surface on it, with this textured surface imparting a surface texture to the wound fiber layer.

Figure 19A:
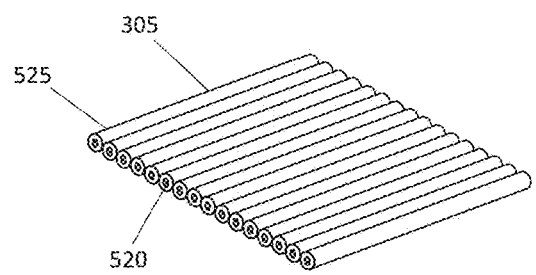
FIGS. 19A through 19C are schematic perspective views of another method of forming a wound material portion, in accordance with some embodiments of the invention.
Figure 19B:
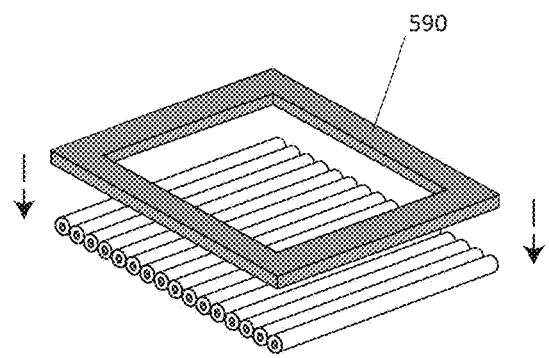
Figure 19C:
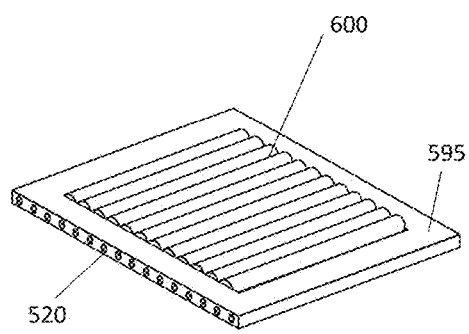

In one embodiment, as shown in FIGS. 19A to 19C, a heat plate 590 can be configured to only apply energy to localized regions of the wound fiber construction, with other regions of the fiber construction remaining unaffected. As a result, structures having localized bonded regions 595 (e.g., the edge region as shown in FIG. 19C), with other regions of the structure containing adjacent, but non-bonded, fiber portions 600 (e.g., the central portion of FIG. 19C).

Figure 21A:
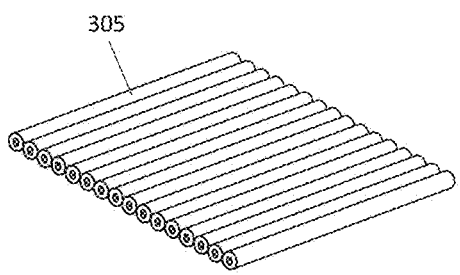
FIGS. 21A through 21C are schematic perspective views of another method of forming a wound material portion, in accordance with some embodiments of the invention.
Figure 21B:
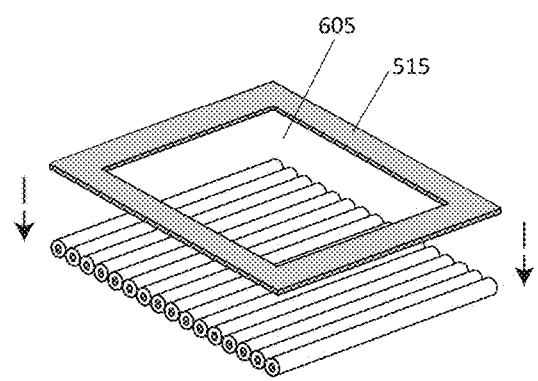
Figure 21C:
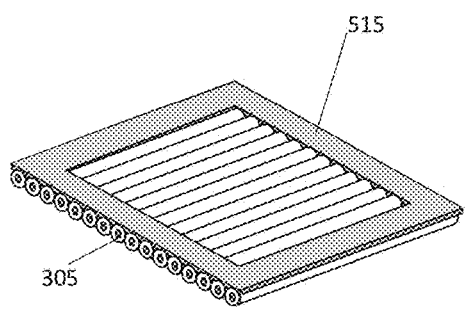

Alternatively, one or more fabric layer (e.g., a base layer and/or cover layer) can be configured to be bonded to selected portions of the wound fiber layer to hold the fibers in place and produce a stable finished part. For example, FIGS. 21A to 21C show a cover layer 515 having an open central region 605 being fixedly attached to a wound fiber layer to create a wound fiber material that is fixedly held in place around its outer edges, but that includes adjacent fibers that are not bonded to each other in a central region surrounded by the bonded edges. In an alternative embodiment one or more fabric portions of any appropriate size or shape can be applied to the wound fiber layer to locally fix the fibers in place while leaving other portions of the wound fibers free.

Figure 20A:
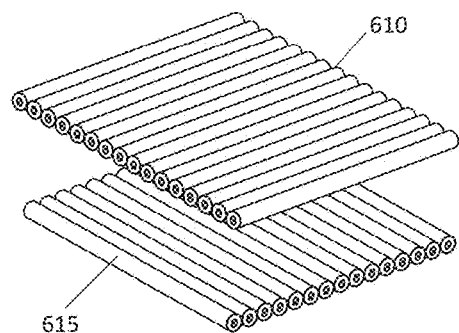
FIGS. 20A through 20C are schematic perspective views of another method of forming a wound material portion, in accordance with some embodiments of the invention.
Figure 20B:
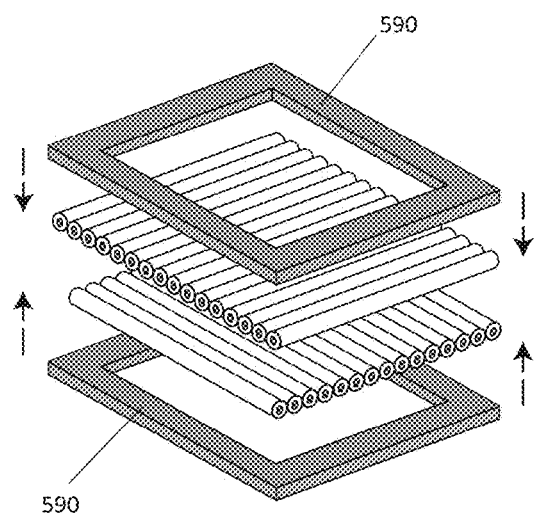
Figure 20C:
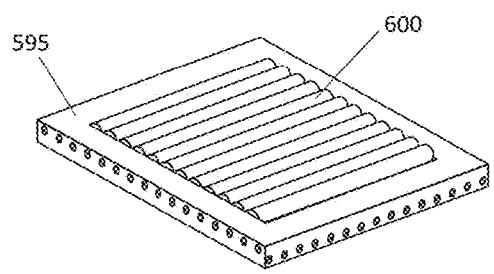

In one embodiment, multiple layers of wound fibers can be laid over each other and thereafter bonded together to form a wound fiber construction having fibers running in a plurality of directions. For example, FIGS. 20A to 20C, show a wound fiber construction including a first fiber layer 610 including a first set of wound fiber portions extending in a first direction and a second fiber layer 615 including a second set of wound fiber portions extending in a second direction perpendicular to the first direction. These wound fiber portions are thereafter treated (e.g., through heat bonding using one or more heat plates 590) to form the finished part.

In alternative embodiments, the two layers can extend at any angle to each other, depending upon the specific structural requirements of the finished material. In further alternative embodiments, any number of layers extending in any number of directions can be utilized. By utilizing combinations of the methods described herein a wide range of aesthetic and structural properties can be incorporated into materials incorporating wound fibers. More particularly, carefully controlling the regions of bonding, and the extent of the bonding in those regions, and carefully selecting the arrangement of fibers within the regions, can control both the aesthetics of the material and the structural properties of the material, with material layers positioned underneath and/or above the wound fiber layer providing additional structural and aesthetic benefits.

Figure 22A:
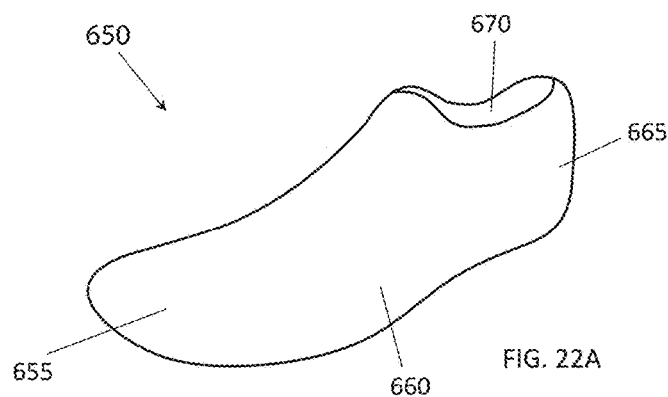
FIG. 22A through 23C are views of exemplary lasts for use in forming a wound material portion, in accordance with some embodiments of the invention.

Exemplary lasts for use as a structural support onto which the fiber(s) can be wound are shown in FIGS. 22A through 23C. The last 650 of FIG. 22A is configured to provide a desired shape for the finished upper of an article of footwear, with the last including a forefoot region 655, midfoot region 660, heel region 665, and foot entry region 670 adapted to substantially conform in shape to the foot of a wearer to provide a comfortable and structurally sound shape for the shoe.

Figure 22B:
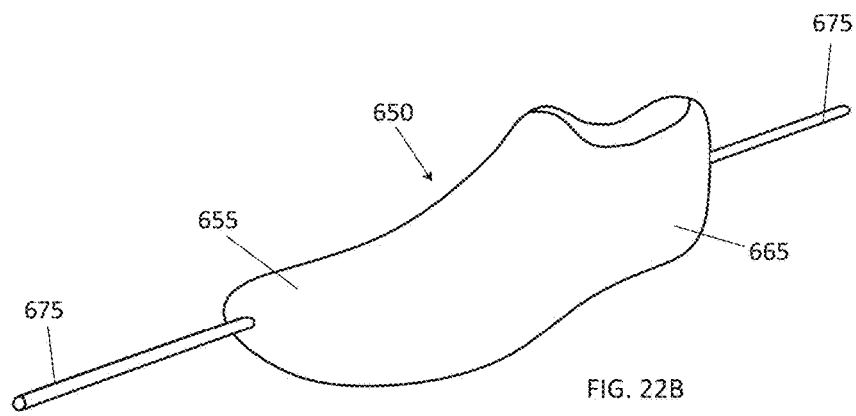

In one embodiment, as shown in FIG. 22A, the last 650 may be freely manipulated, such that it can be held by hand or by one or more gripping device when winding one or more fibers onto the last 650. In another embodiment, as shown in FIG. 22B, the last 650 may be mounted onto a mounting element 675 (in this case a rod extending out from the forefoot region 655 and heel region 665 of the last 650), with the mounting element 675 providing means for the last 650 to be mounted to a stationary or movable mounting structure during winding. For example, the rod 675 can be mounted to a motorized structure that can spin the last 650 around to facilitate winding of one or more fiber(s) from one or more fiber delivery elements.

Figure 22C:
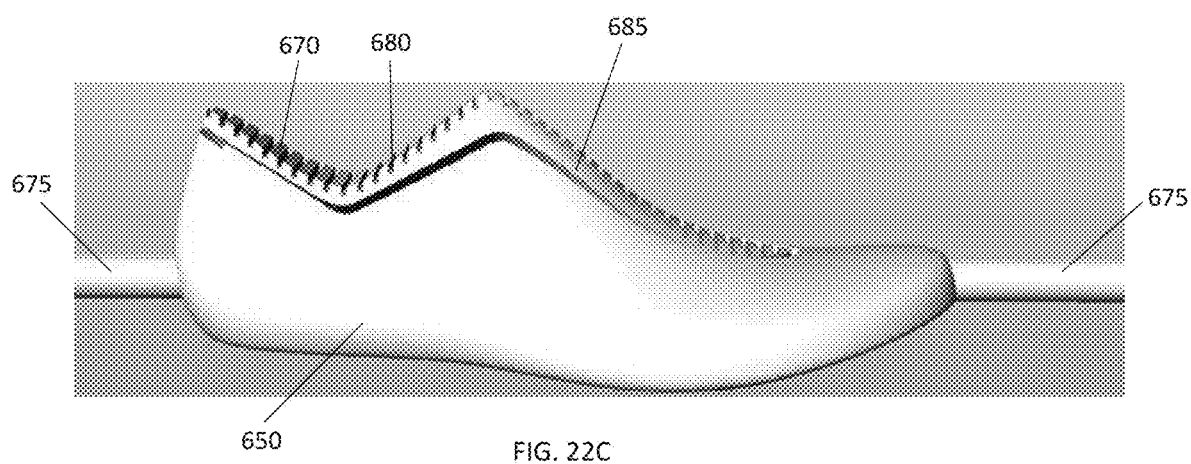
Figure 28A:
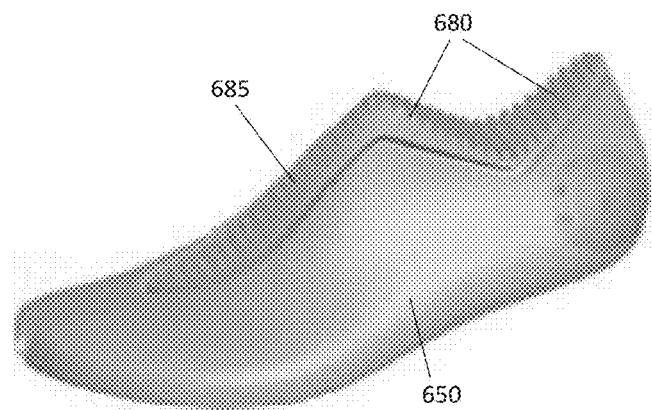
Figure 31A:
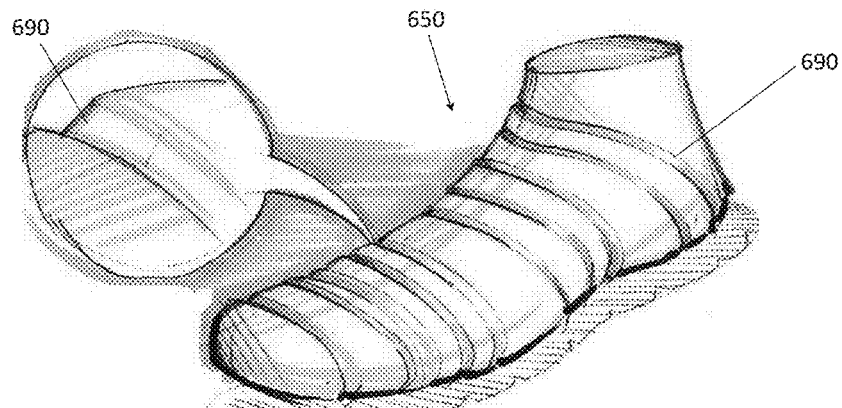
Figure 31B:
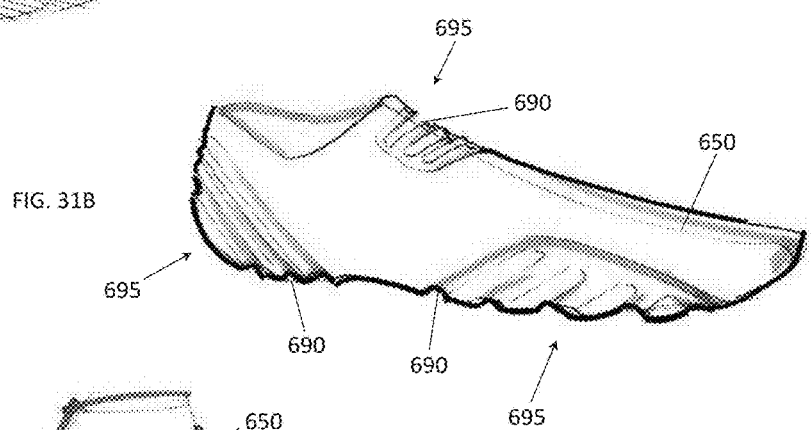
Figure 31C:
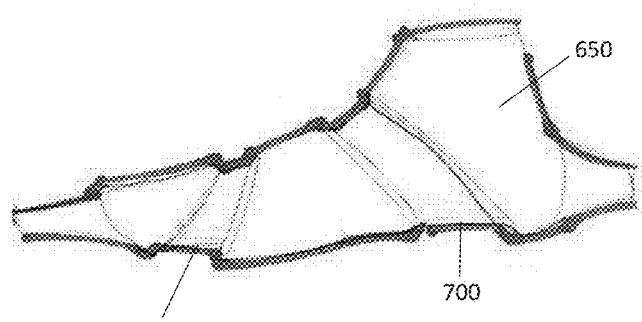
Figure 31D:
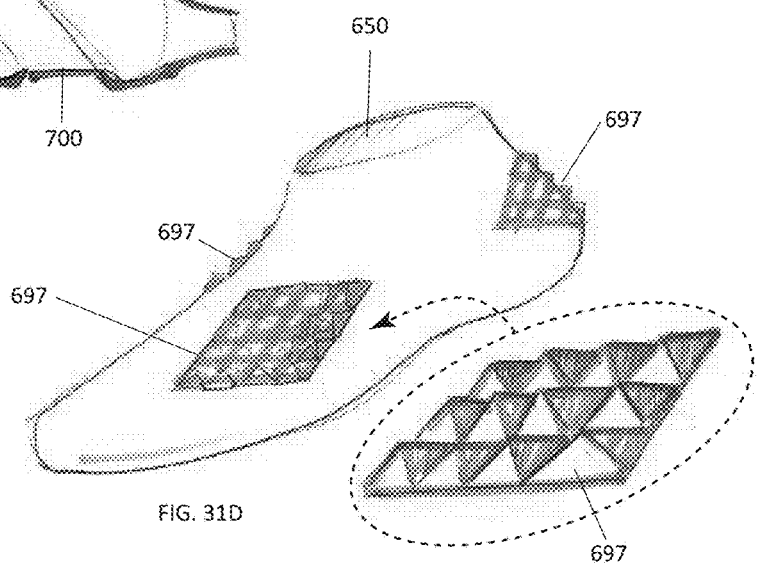

In order to guide and control the location of the wound fiber on the last 650 (e.g., to ensure the correct positioning and spacing of each wind of the fiber around the last 650) the last can include guiding features to control the location of the fiber. For example, FIGS. 22C and 28A shows a last 650 having a plurality of regularly spaced notches 680 in the instep region 685 and foot entry region 670 into which each wind of the fiber (or some of the winds of the fiber) is held to ensure that the fiber is correctly positioned on the last 650 during manufacture. In alternative embodiments, slots, grooves, pins, bumps, or other texturing, and/or adhesives, suction or other methods of releasably holding a material in place on a structure can be utilized to ensure the desired placement and configuration of fibers on the support structure. In one embodiment, as shown in FIG. 31A, grooves 690 can extend totally around the last 650 to provide a channel into which the fiber is wound. In the embodiment of FIG. 31B, the last 650 includes a plurality of localized groove regions 695 to guide and hold the wound fiber(s) in these regions while leaving the fiber free to be wound around the rest of the last 650 without guidance from the last 650 itself. In the embodiment of FIG. 31C, the last 650 includes a plurality of wide channels 700 that are adapted to hold a plurality of adjacent wound fiber portions to create broad bands of wound material in localized regions of the resulting shoe upper. In the embodiment of FIG. 31D, the last 650 includes regions of raised texturing 697 (in this example having a knurled texture) to hold the base material in position during the winding of one or more fibers over the base material. In various embodiments any appropriate texturing can be used.

In one embodiment, the grooves or other guides can be used to create an open wound structure for the upper, with spacing between each wind of the fiber. In one embodiment, a base material can be placed over the last, with the grooves underneath, such that the grooves can provide guides for the fiber as it is wound over the base material. In one embodiment, the guides can be used to create an inner wound material layer, with one or more outer wound layers being wound over the base layer. Alternatively, or in addition, an outer layer of fabric can be placed over the last after the fibers have being wound onto the last (and, in certain embodiments, wound onto the guiding grooves) to create an upper with an outer fabric surface with a wound structural support layer positioned thereunder.

Figure 28B:
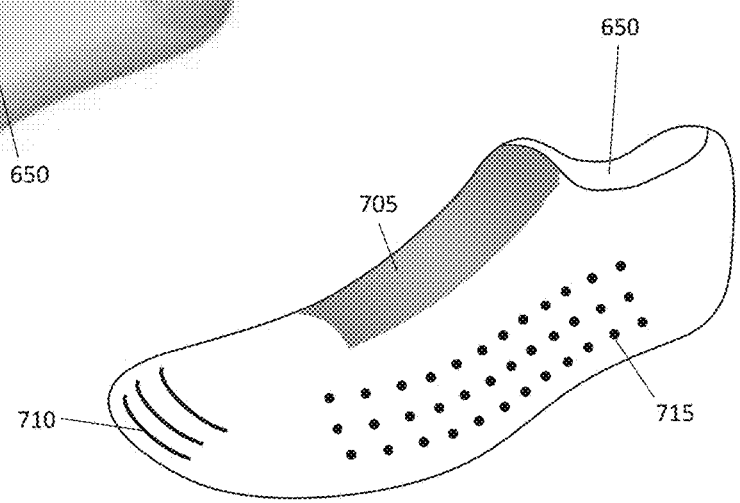

Various other features may be incorporated into lasts to assist in the construction of wound uppers, or wound upper portions. For example, in one embodiment heating elements (or other types of energy producing elements) can be incorporated into the last to heat or otherwise treat the wound fibers being wound onto the last. As shown in FIG. 28B, such heating elements can take the form of heat plates 705, heated wires 710, heat ejection ports 715, or a combination thereof. In one embodiment the entire last 650 can be heated to assist in fusing the wound fibers into a final form.

Figure 28C:
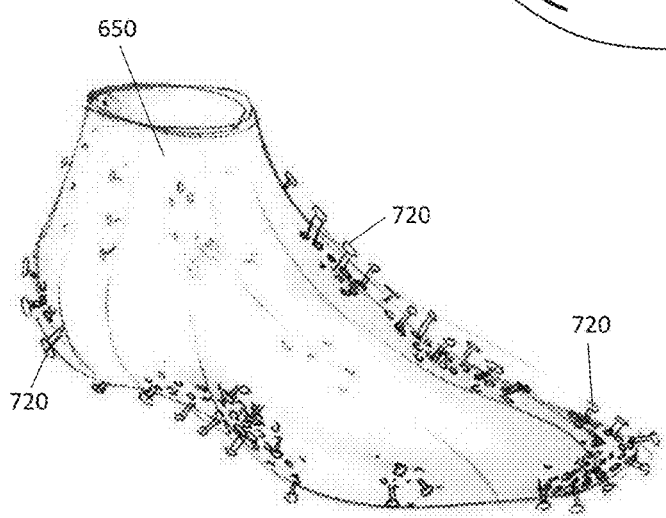
Figure 28D:
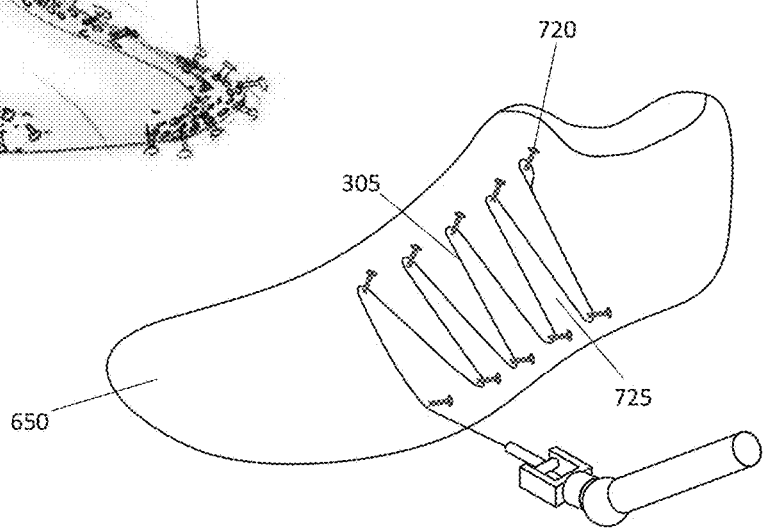

In one embodiment, pins 720 can be positioned on the surface of the last 650 to interact with the fiber and to hold the wound fiber in a specific configuration, as shown in FIG. 28C. These pins may be permanently placed on the last 650 or may be retractably embedded within the last 650 so that they can extend out from the surface of the last 650 to support the positioning of the wound fiber during construction, but can be retracted after construction to facilitate removal of the wound upper from the last 650. In one embodiment, the pins 720 can be extended prior to the fiber being wound onto the last 650, in order to provide anchoring points for the fiber during winding. In an alternative embodiment, the pins 720 can be extended after winding of the fiber 305 onto the last in order to hold the fiber 305 in place after it has been positioned on the last 650. In one embodiment, the pins 720 can be used to provide anchoring positions around which a fiber 305 can be wound, thereby allowing the wound fiber 305 to be positioned locally on one or more portions 725 of the last 650 without having to be wound entirely around the last 650, as shown in FIG. 28D. In an exemplary embodiment, a break-last (i.e., a last that can be moved between a first position for forming the shoe and a second position for retracting the last from the finished upper) having retractable pins (that can retract when removing the last from the finished upper) can be used.

Figure 29:
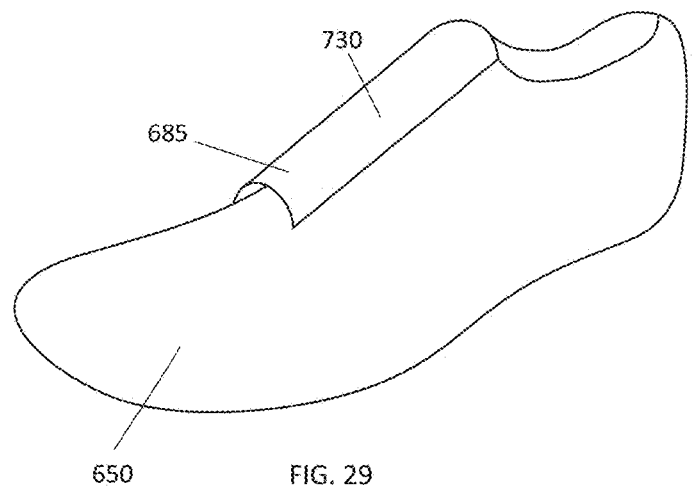
Figure 30A:
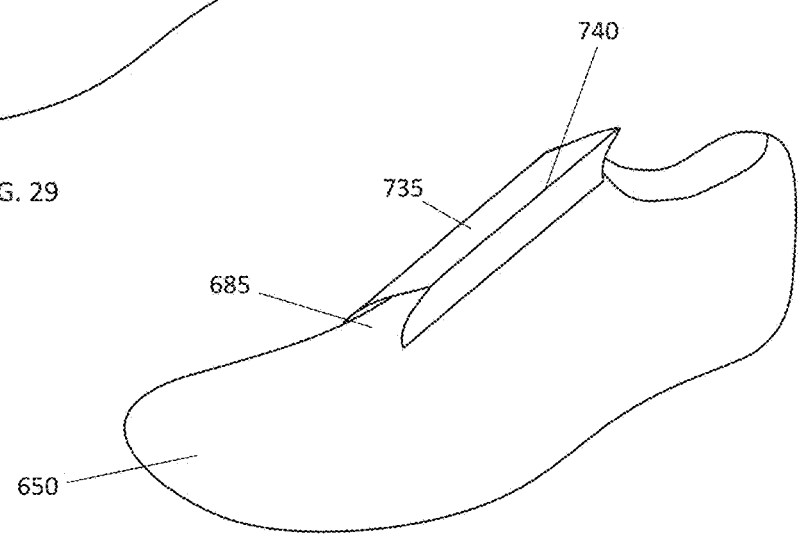
Figure 30B:
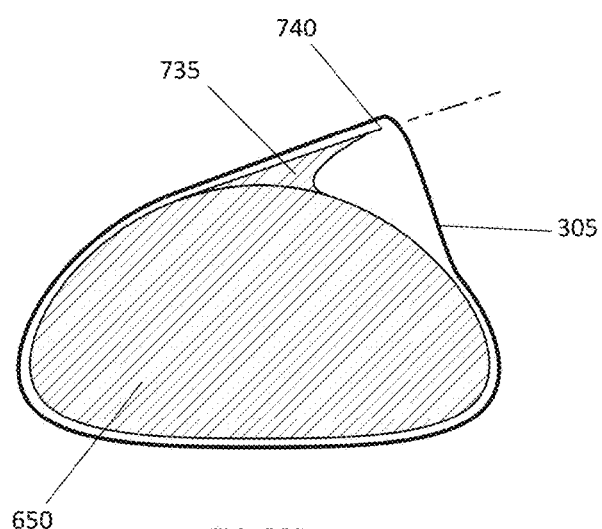
Figure 30C:
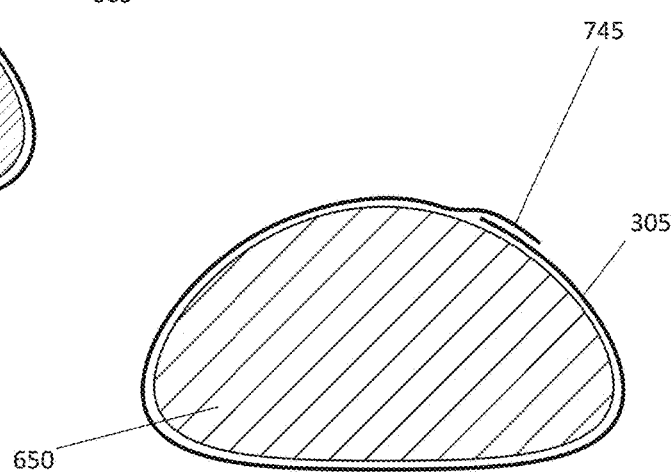

In certain embodiments, bumps or other structural extensions can be added to the last 650 to effect the shape of the finished upper. For example, a raised portion 730 can be added to the instep region 685, as shown in FIG. 29, to increase the amount of wound material over that region to provide for tongue portions or to provide for different widths for the shoe. In one embodiment, as shown in FIGS. 30A to 30C, a wedge element 735 can be placed on the instep region 685 of the last 650 to increase the material covering that region. After winding the fiber 305 over the last 650 the material can be cut along the edge 740 of the wedge 735, as shown in FIG. 30B, and the material on either side of the cut can thereafter be overlapped, as shown in FIG. 30C, to provide for a means for opening and closing the shoe to facilitate entry and exit of a foot. The overlapping portions 745 can have hook and loop systems, or other detachable closing means, added to hold the overlapping portion in a closed configuration when the shoe is being worn. In alternative embodiments various extensions can be permanently or detachably added to any portion of the last to provide means or adjusting the distribution of wound material on the last depending on the required structure and fit of the upper being formed.

In certain embodiments, cavities or other structural features can be positioned on the surface of a last, at any appropriate location, to allow structural elements (e.g., cushioning elements, lacing elements, or structural support elements, etc.), to be placed on the last prior to winding. As a result, the fiber can be wound over the structural elements and thereafter bonded or otherwise attached to the structural elements to create a wound upper with built in structural elements. FIG. 32A, for example, shows a last 650 having a plurality of grooves 690 for guiding the positioning of the wound fiber and a cavity 750 for holding a heel cushioning element. After the heel cushioning element 755 is placed within the cavity 750, as shown in FIG. 32B, one or more layers of fiber can be wound around the last to create the wound upper. Upon completion, as shown in FIG. 32C, the cushioning elements 755 are located and held in place on an inner surface of the wound upper to provide additional cushioning, e.g., around an ankle of a wearer. In one embodiment a base layer can be placed over the last 650 prior to winding or adding the structural element(s) such that, after winding, the structural elements are held between the base material and the wound fiber(s).

Figure 23A:
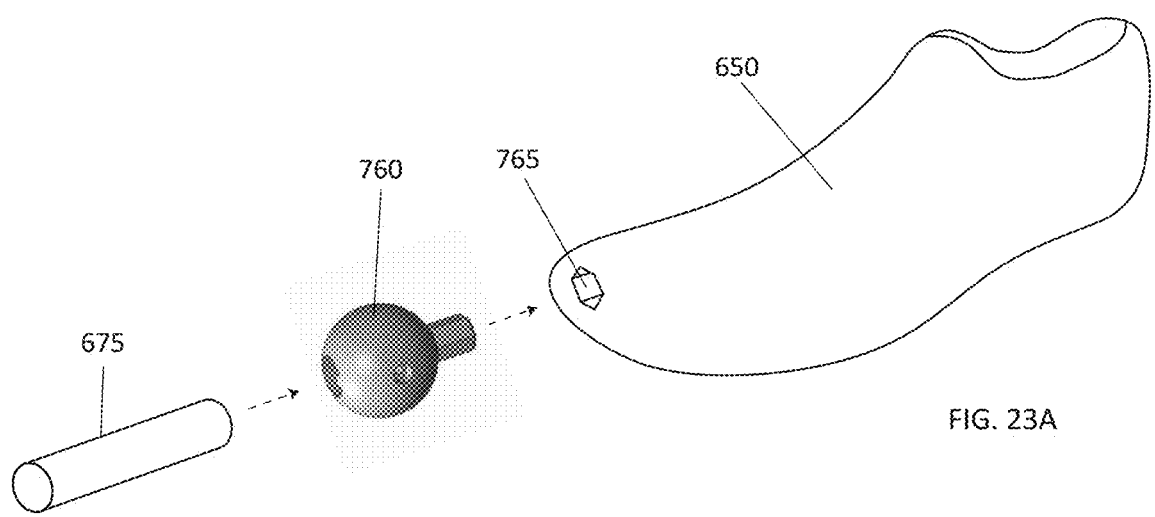
Figure 23B:
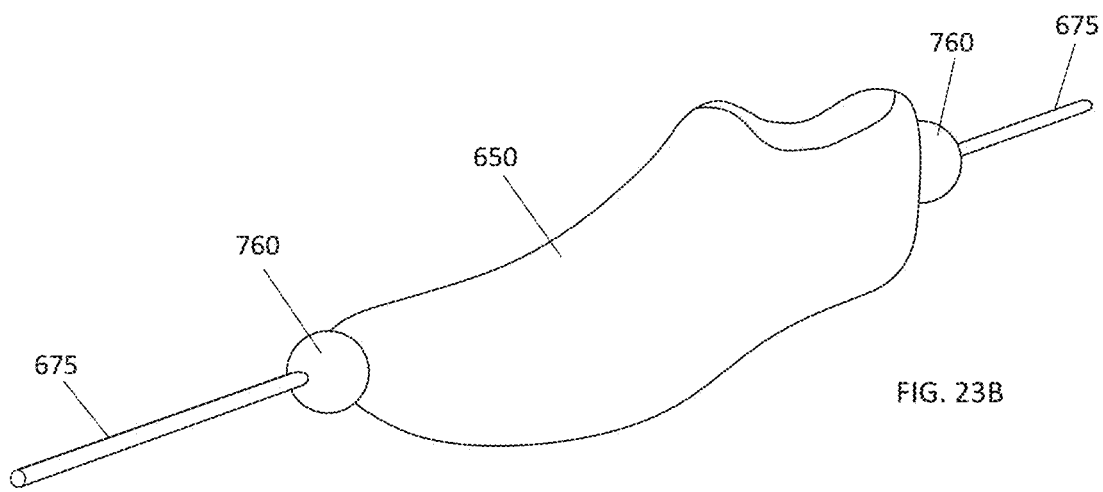
Figure 23C:
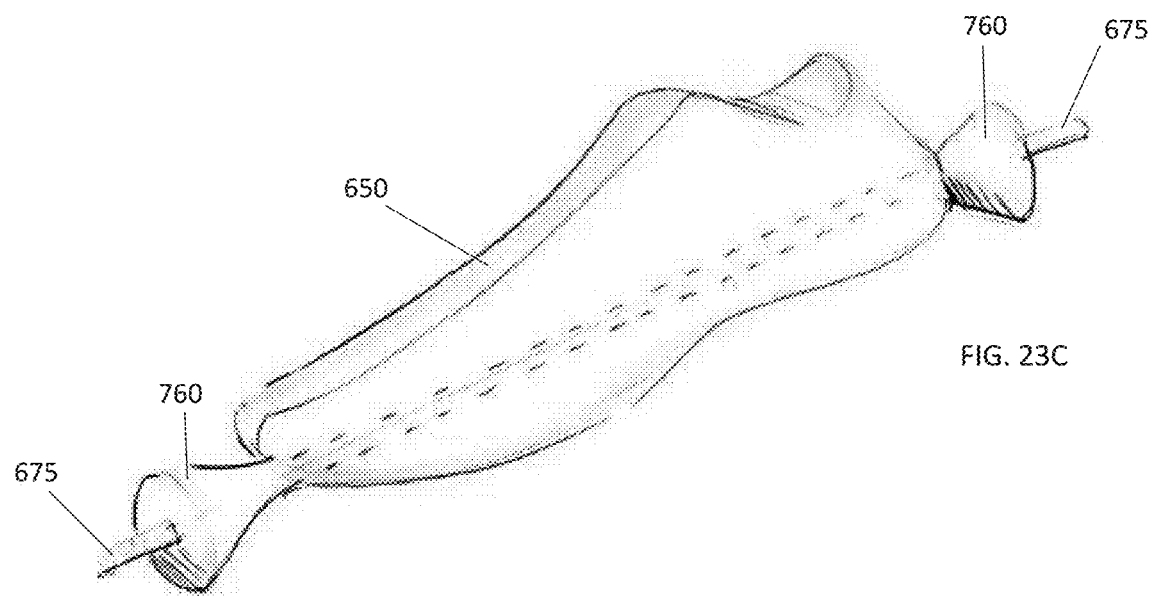

In one embodiment, an end effector element 760 can be positioned between the last 650 and the rod 675 to prevent the wound fiber from slipping off the end of the last and onto the rod during winding. This end effector element 760 can be placed at only one end 765 of the last 650, as shown in FIG. 23A, or on both ends of the last 650, as shown in FIGS. 23B and 23C. The end effector element 760 can be formed as a sphere (FIGS. 23A and 23B) a cone, as shown in FIG. 23C, or any other appropriate shape. In operation, the fiber proximate the toe and heel of the last 650 are prevented from slipping off the last 650 by the end effector elements 760. Then, after removing the wound fiber from the last 650, any excess material at the toe and/or heel can be cut away, with the open ends thereafter covered by a toe cap and heel cap to finish the upper.

The fiber may be wound around the last, or other structural support element, by providing a mechanism to spin the last while a stationary fiber delivery element (or a fiber delivery element with limited movement—e.g., movement in only one axis) guides the fiber onto the spinning last after an end of the fiber has been tacked or otherwise fixed to the last prior to spinning. Alternatively, the last can be held in place while one or more fiber delivery elements spin around the last to guide the fiber onto the last. In further embodiments, both the last and fiber delivery element(s) can be adapted to move in relation to one another in one or more axis to accurately position the fiber on the last in the correct orientation and at the correct tension. The correct tension can be applied, for example, by varying the distance between the fiber delivery element and the surface to which the fiber is applied, with a greater distance corresponding to an increased tension. In one embodiment, increasing the tension in the fiber has the effect of stretching and reducing the diameter of the fiber, which can allow the thickness of the fiber to be varied along the extent of the fiber as it is laid on the upper.

Figures 24A, 24B:
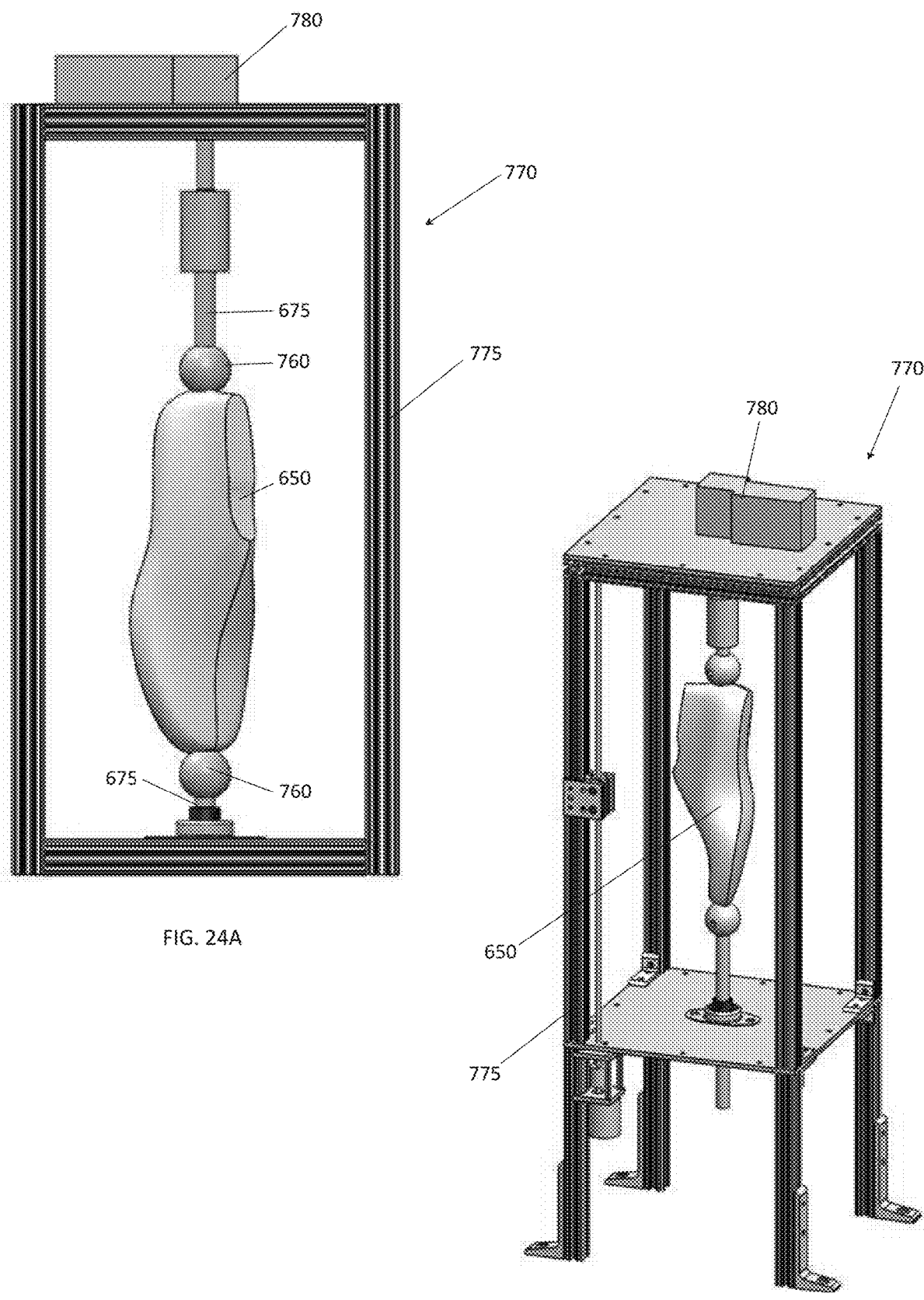
FIGS. 24A and 24B are schematic views of a system for mounting a support structure for use in forming a wound material portion, in accordance with some embodiments of the invention.
Figure 25A:
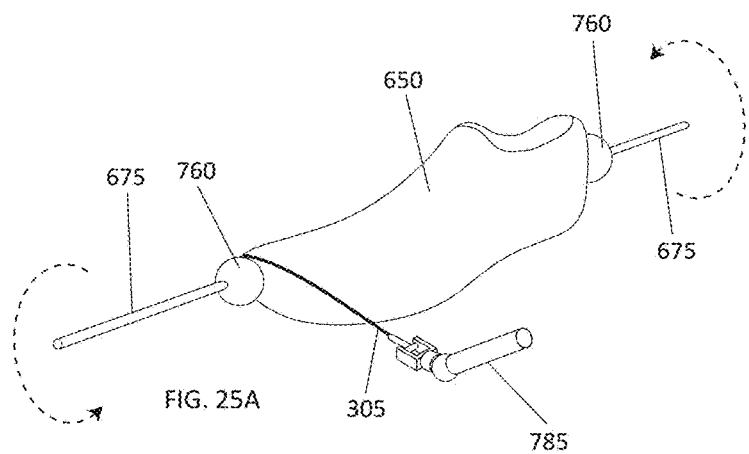
FIGS. 25A through 25E are perspective views of a method of forming a shoe including a wound material portion, in accordance with some embodiments of the invention.
Figure 25B:
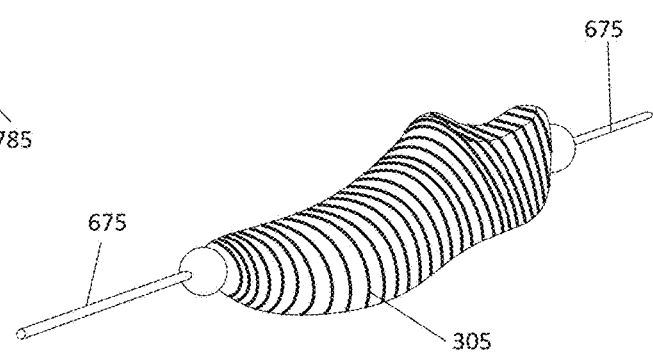
Figure 25C:
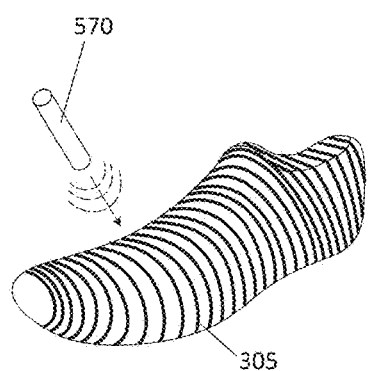
Figure 25D:
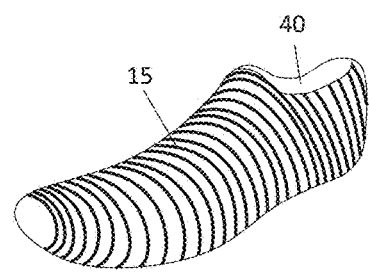
Figure 25E:
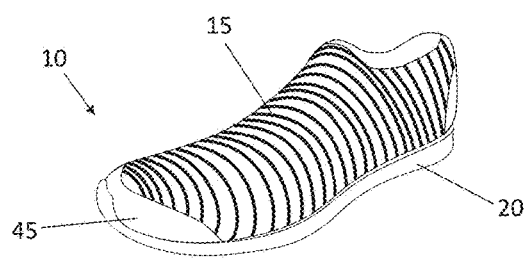

An exemplary mount 770 for holding and spinning a last 650 and mounting rods 675 is shown in FIGS. 24A and 24B. In this embodiment, the mounting rods 675 are anchored to a frame 775 at first and second ends such that the last 650 is held between the first and second ends and is free to spin around the longitudinal axis of the rod. A motor 780 mounted on the frame 775 can then be used to spin the last 650 with the appropriate speed and torque. In operation, a first end of the fiber to be wound around the last 650 is anchored to the last at a first end (for example at the toe end of the last 650 proximate an end effector element 760) prior to starting the winding process. The last 650 is then spun at an appropriate speed and torque such that the fiber delivery element 785 can guide the fiber 305 onto the last 650 as it spins (as shown in FIG. 25A). The fiber delivery element 785 can move with respect to the last 650 to allow the fiber 305 to be positioned in a spiral arrangement over the last 650 such that the last 650 is covered in a continuous arrangement of adjacent parallel fiber portions (as shown in FIG. 25B). The rods 675 and end effector elements 760 can thereafter be removed and the fiber treated 570 (e.g., heat fused) to form a banded stable wound structure (as shown in FIG. 25C). The wound fiber can then be cut to remove the material from the foot entry region 40, and the remaining material can be removed from the last (as shown in FIG. 25D). A toe cap 45, sole 20, and any other appropriate finishing elements can be added to the wound upper 15 (either before or after removing the upper from the last) to create the finished shoe 10 (as shown in FIG. 25E).

Figures 26A, 26B, 26C:
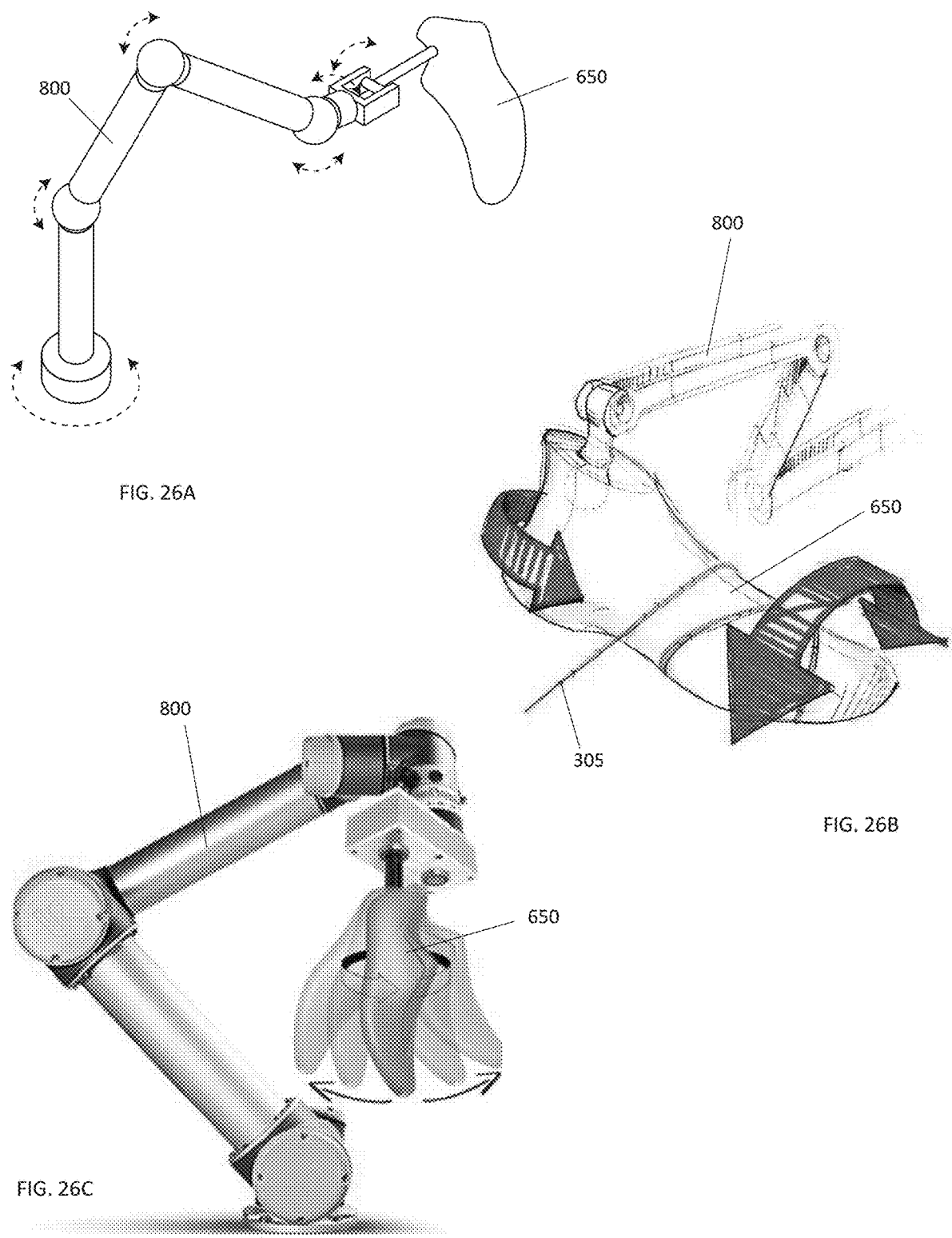
Figure 27A:
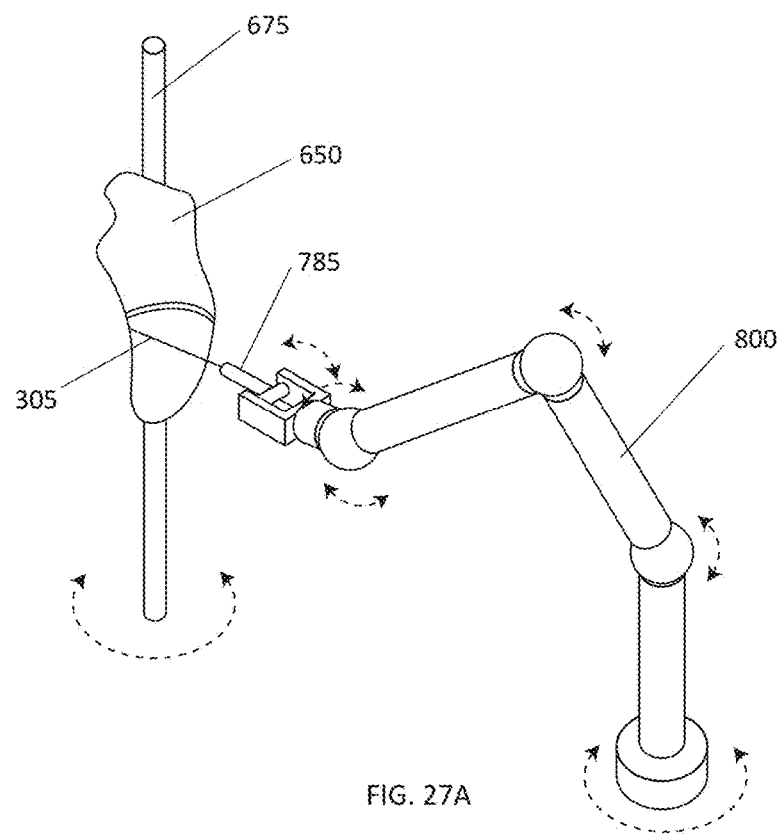
Figure 27B:
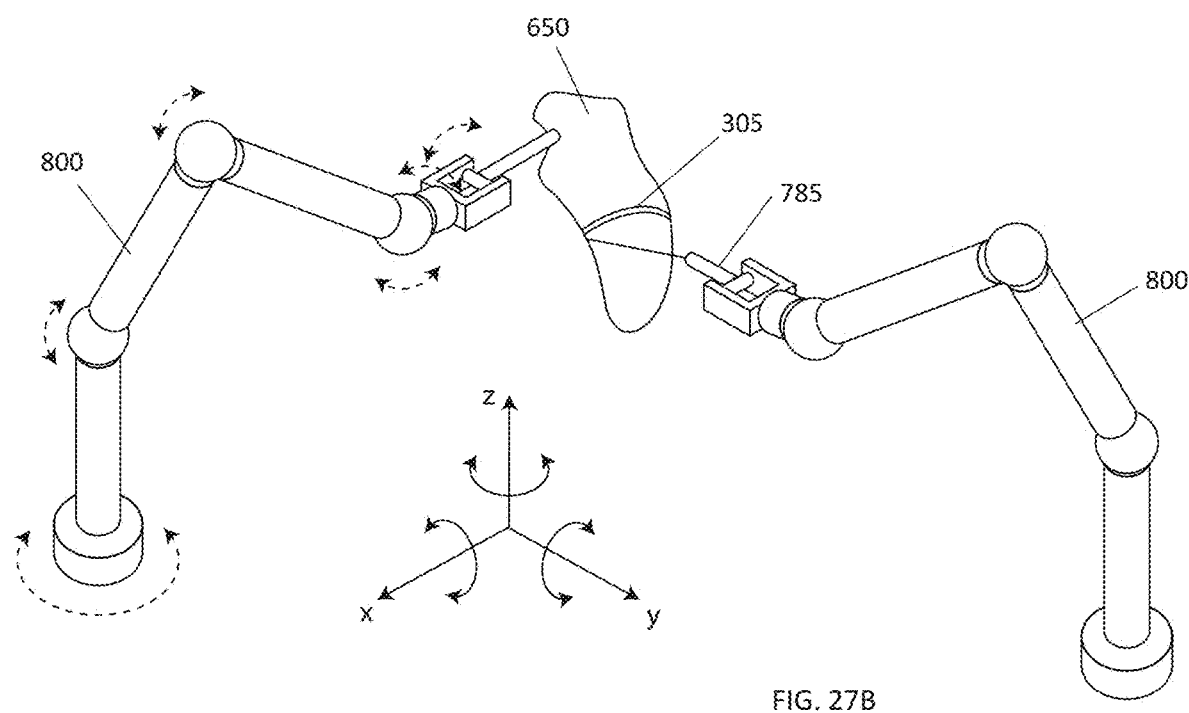

In one embodiment, the last 650 can be connected to a multi-degree-of-freedom robot arm 800 that can position the last 650 in any position, and at any angle, with respect to one or more fiber delivery element(s) 785, as shown in FIGS. 26A through 26C. In another embodiment, the fiber delivery element(s) 785 can be mounted to multi-degree-of-freedom robot arms 800 to allow the end of the fiber delivery element(s) 785 to be positioned at any location, and at any angle, with respect to the last 650, as shown in FIG. 27A. In a further embodiment, both the last 650 (or other structural support element) and the fiber delivery element(s) 785 can be mounted on multi-degree-of-freedom robotic arms 800 to allow them to move independently with respect to one another, as shown in FIG. 27B.

In certain embodiments, the last can be configured to expand and contract; thereby allowing it to be reduced in size after the upper has been wound onto the last to facilitate removal of the finished upper from the last. In one embodiment, as shown in FIG. 33, the last 650 can include a bladder 805 on an outer surface 810 that can be filled with a liquid or gas to expand to a first size 815 during application of the fiber and contracted to a second, smaller, size 820 when removing the upper from the last 650. In various embodiments, a single bladder covering the entire outer surface can be used. Alternatively, one or more bladders covering localized regions of the last can be used.

In one embodiment, a last 650 can be formed from a plurality of expandable plates 825 that can be mechanically or hydraulically expanded and contracted to change the size of the last 650, as shown in FIG. 34. In another embodiment, the last 650 can include a toe portion 830 and a heel portion 835 incorporating expandable rod holders 640, as shown in FIGS. 35A through 35C. In operation, when expansion rods 845 are removed, the toe 640 and heel rod holders at least partially close (as shown in FIG. 35C), thereby reducing the size of the heel 835 and toe portions 830 of the last 650 to facilitate removal of a wound upper formed on the last 650 (and/or to facilitate the placement of a base layer bootie on the last 650 prior to winding). However, when the expansion rods 845 are inserted into the rod holders 640 they force out the walls of the last 650 in the heel 835 and toe portions 830 and increase the size of the last 650 to the size needed for application of the fiber.

In one embodiment of the invention, the structural support onto which the wound fiber 305 is placed can be a cylindrical support structure 850 sized and adapted to allow for the creation of a plurality of footwear upper shells 855 in a single operation. In this embodiment, as shown in FIGS. 36A to 36D, one or more fibers 305 are wound onto the cylindrical support structure 850 to create a wound fabric 860, with one or more heating elements 570 fusing the fiber to form a structurally stable wound fabric 860. The wound fabric 860 can thereafter be removed from the cylindrical support structure 850, and elements can be cut from the wound fabric 860 (as shown in FIG. 36B) to create a plurality of separate upper shells 855 (as shown in FIG. 36C). These shells 855 can then be used to form the upper 15 of a finished shoe 10 (as shown in FIG. 36D) through traditional shoe lasting and assembly techniques.

In one embodiment, a base layer material can be place on the cylindrical support structure 850 prior to winding the fiber 305, thereby forming an upper shell with a base layer having wound structural and/or decorative portions wound thereon. In one embodiment one or more outer material layers can be placed on top of the wound layer while the wound layer 860 is still positioned on the cylindrical support structure 850. In certain embodiments, the cylindrical support structure 850 can include heating elements, or other material treatment elements, to bond the fibers and/or otherwise treat the fibers to create a stable structure.

Figure 37A:
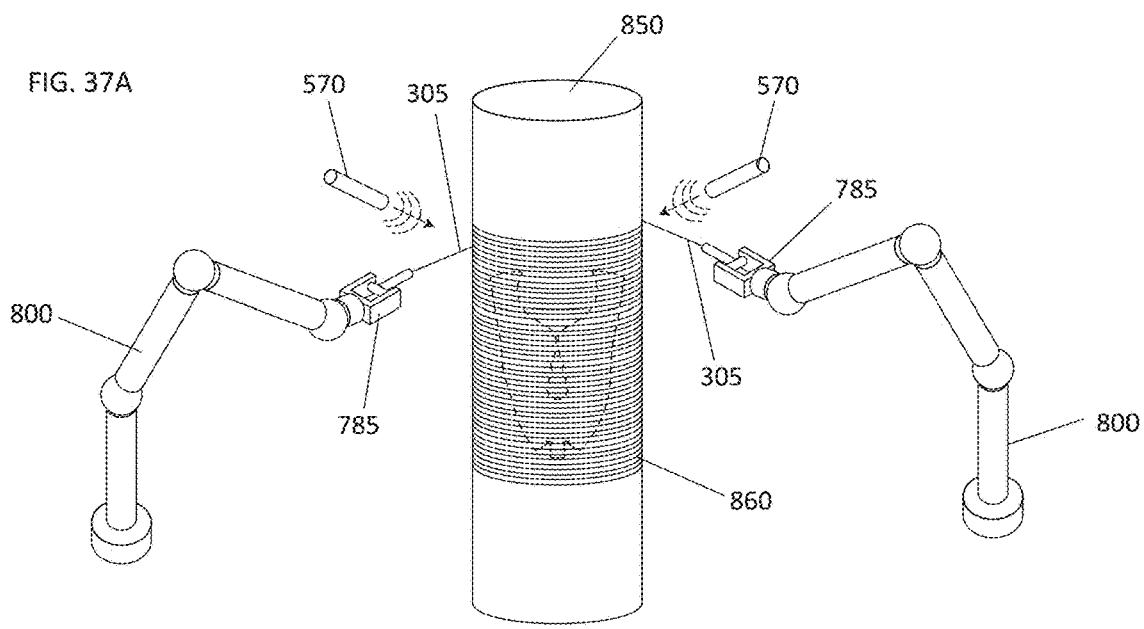
FIGS. 37A through 37C are views of other systems for use in forming a shoe including a wound material portion, in accordance with some embodiments of the invention.
Figure 37B:
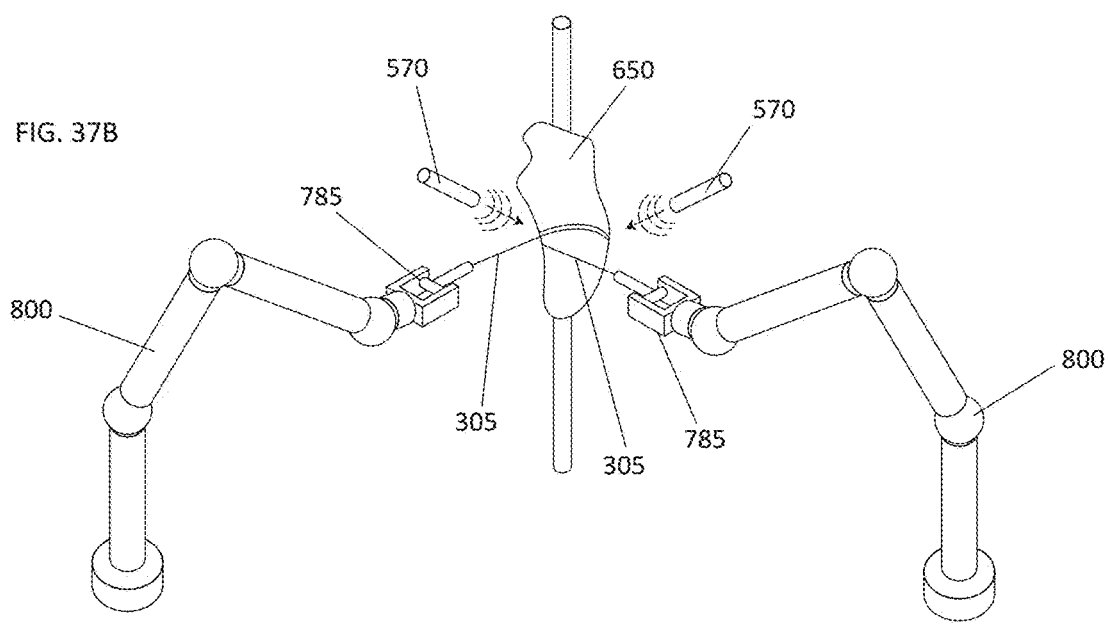

In one embodiment, a fiber delivery element 785 can be placed on a multi-degree-of-freedom robot arm 800 to allow for the creation of intricate wound structures on the cylindrical support structure 850 through control of the positioning and orientation of the fiber delivery element 785 during winding. In one embodiment, the cylindrical support structure 850 can rotate with respect to the fiber delivery element 785, while in another embodiment the fiber delivery element 785 can rotate around the cylindrical support structure 850 to wind the fiber 305 onto the cylindrical support structure 850. In certain embodiments, a plurality of fiber delivery elements 785 can be used, either in series or in parallel, to form a multi-fiber wound material. Utilizing multiple fiber deliver elements 785 in parallel, as shown in FIG. 37A, allows for the creation of a woven or otherwise interlocking structure, while applying different fibers in series allows for the creation of a layered material. In one embodiment the cylindrical support structure 850 can be replaced by a last 650, as shown in FIG. 37B, to allow the upper to be wound directly onto the last 650, as described above.

Figure 37C:
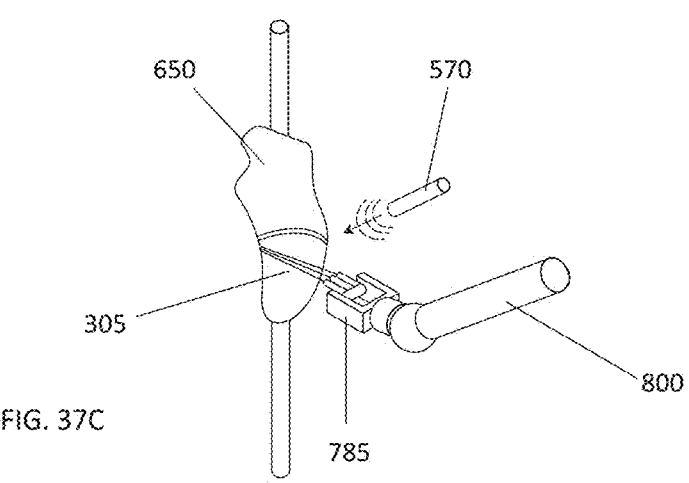

In one embodiment, multiple fibers 305 can be delivered from a single fiber delivery element 785, as shown in FIG. 37C. In this embodiment, the fibers 305 can either be delivered together to create a structure having multiple adjacent fibers being wound together in a band onto the last or cylindrical support structure. In an alternative embodiment, the fiber delivery element 785 can selectively deliver one (or more) of the fibers 305 at a time, and change the fiber being delivered at any time, to position different fibers, or combinations of fibers, on different regions of the upper. This may be beneficial, for example, in forming an upper having different colors and/or structural properties in different regions.

The fiber(s) can be heated or otherwise treated to bond the fibers together (and/or bond them to a base material) through application of energy from elements embedded within the support structure and/or through elements associated with the fiber delivery element, or through separate elements incorporated into the manufacturing system. In one embodiment, a heating element is positioned on the fiber delivery elements (directly behind the fiber laying mechanism) such that immediately upon laying of the fiber onto a base material the fiber is heated to fuse it to the base layer. The fibers may be treated along their entire length to globally treat the wound material, or be locally treated at discrete locations to tack the material at discrete points. Alternatively, one or more heating elements may be positioned to heat the fiber immediately, or substantially immediately, prior to it being placed against the base material, with elements such as a roller being used to provide a biasing force to bond the heated fiber to the base material.

Figure 38:
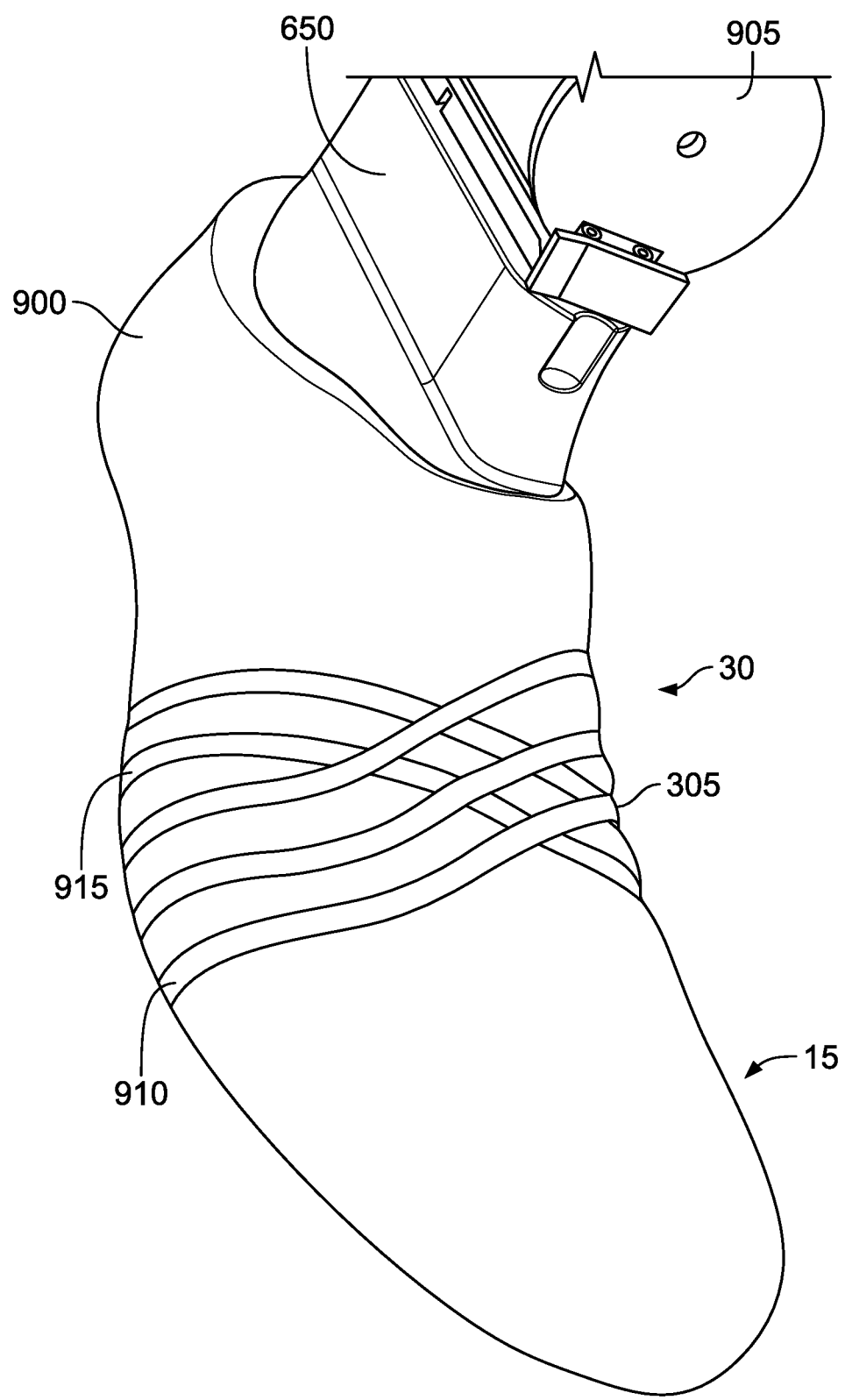
FIG. 38 is a perspective view of an upper for an article of footwear with a wound fiber portion incorporated thereon, in accordance with some embodiments of the invention.

An exemplary upper for an article of footwear is shown in FIG. 38. The upper is formed by first placing a base layer formed into a bootie 900 (or sock) construction onto a last 650. The last 650 is positioned on a mounting element 905 that is adapted to controllably rotate the last 650 about an axis of rotation and move the last 650 linearly along the axis of rotation. In alternative embodiments, the mounting element can be adapted to controllably move and rotate a last around any combination of linear and/or angular degrees of freedom. Once the bootie 900 is correctly positioned on the last 650, and the last 650 is correctly positioned with respect to the fiber delivery element, the fiber is wound onto the bootie. The fiber shown in FIG. 38 is a strip of heat fusible tape that can be heated by a heating element as it is being positioned on the bootie 900 to permanently fuse the fiber to the bootie 900. The start of the fiber and the end of the fiber are positioned and tacked to the underside of the bootie 900 so that it is covered by the sole of the shoe upon assembly of the finished shoe. Alternatively, the start and end points of the fiber laying can be covered by another element (e.g., a toe cap, heel cap, or another portion of the fiber itself). Alternatively, the start and end points of the fiber can be left visible upon assembly.

The fiber is wound around the midfoot portion 30 of the upper 15 as a number of substantially parallel separated bands 910 extending in a first direction, and a number of substantially parallel separated bands 915 running in a second direction different from the first direction. This structure provides support and resistance to stretching within the midfoot region 30 along the elongate direction of the bands without negatively affecting the flexibility of the midfoot region 30. In alternative embodiments, any appropriate pattern of fibers can be laid onto the bootie depending upon the specific structural features and aesthetics required.

Figure 39A:
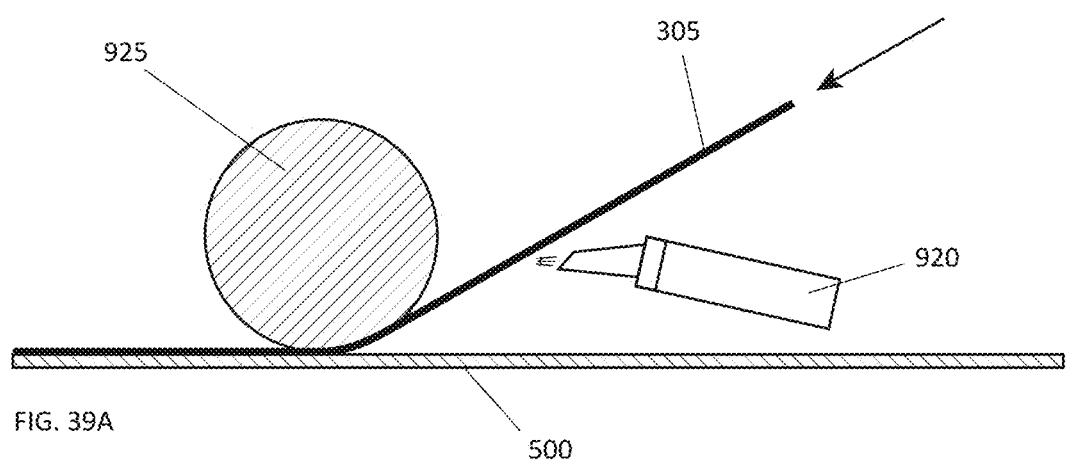
FIGS. 39A through 39C are schematic views of exemplary methods for attaching a wound element to a base material, in accordance with some embodiments of the invention.
Figure 39B:
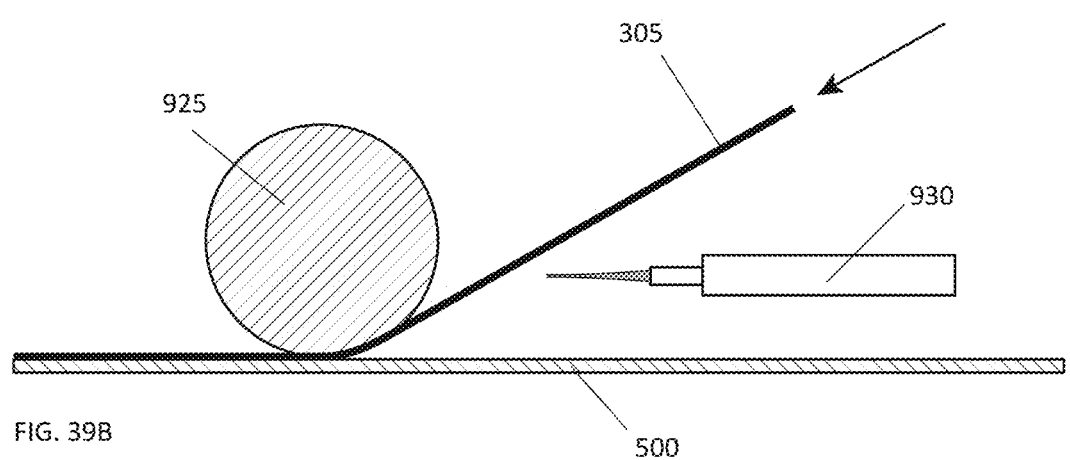
Figure 39C:
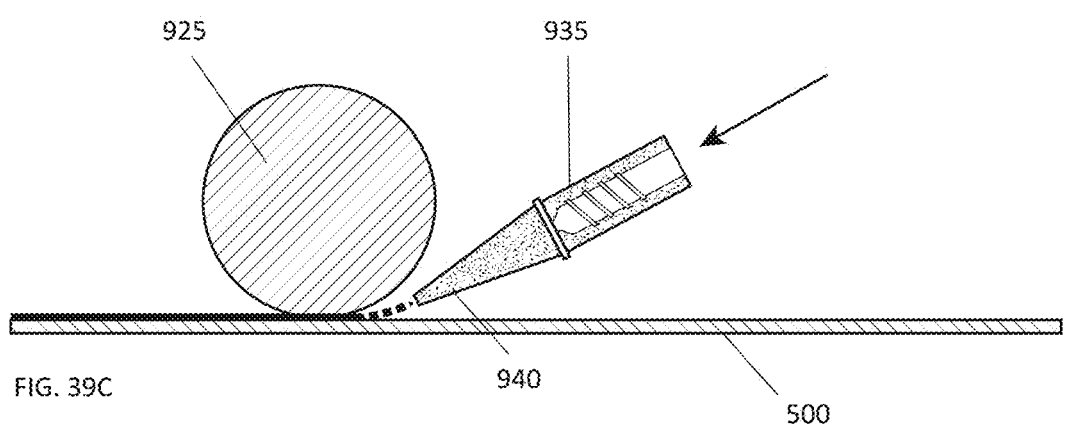

Various exemplary methods of applying the fiber 305 to a base material 500 can be seen in FIGS. 39A to 39C. In FIG. 39A, a fiber 305 is unspooled from a fiber feeder (not shown) and fed past a heat gun 920 (or other heating element 570) to heat the fiber to a temperature sufficient for it to bond to the base material 500 but below the temperature at which the fiber will lose structural stability (e.g., plastically stretch, liquefy, or break). The fiber 305 is then fed between a roller element 925 and the base material 500 such that the combination of heating of the fiber 305 and pressure applied by the roller element 925 fixedly bonds the fiber 305 to the base material 500. The amount of heat applied to the fiber 305 can be varied by varying the power of the heat gun 920 and/or the distance between the heat gun 920 and the fiber 305. This may be beneficial in varying the extent by which the fiber 305 melts prior to being bonded to the base material 500, which can thereby controllably vary the extent of the bonding of the fiber 305 to the base material 500 to control the local properties of the finished material.

In operation, the temperature applied to the fiber 305 can at least partially determine the speed at which the fiber 305 can be laid down in order to obtain a sufficient bond strength, with a higher temperature allowing for a faster application speed. Depending upon the specific material(s) selected for the fiber 305, the specific application speed required, and the specific bond strength required, the nozzle temperature can range from about 150 to 700° C., or 175 to 650° C., with an associated fiber 305 application speed of between about 0.1 to 5 inch/second, or 0.1 to 3 inch/second.

In an exemplary embodiment, the heating element(s) 570 can have a nozzle temperature of between about 175 to 300°

C. with a fiber 305 application speed of between about 0.2 to 1 inch/second and, for example, have a nozzle temperature of at or about 175° C. and an application speed of at or about 0.2 inch/second. In an alternative embodiment, the heating element(s) 570 can have a nozzle temperature of at or about 550 to 650° C. with an application speed of at or about 2.625 inch/second. In further embodiments other combinations of heat element temperature and fiber application speed may be utilized, depending upon the specific fiber material and heat element being used and the specific bond strength between the fiber and the base material required. In addition, the bond between the fiber and the base material may be controlled to provide different bond strengths at different portions of the base material by varying the heat element temperature and fiber application speed during application. This localized change in bond strength may be abrupt/stepped or change smoothly between two portions of the base material.

In various alternative embodiments other types of heating element(s) can be used in addition to, or instead of, the heat gun 920. For example, FIG. 39B shows a fiber 305 being fed past a laser 930, with the laser 930 controllably heating the fiber 305 prior to laying. In other embodiments, one or more heated roller, one or more electromagnetic heating elements, or any other appropriate heating mechanism can be used to heat the fiber 305.

In an alternative embodiment, the fiber 305 can be extruded from an extruding device 935, as shown in FIG. 39C. In this embodiment, the nozzle 940 of the extruding device 935 is positioned proximate the base material 500 and roller 925 to extrude the material onto the base material 500, with the roller 925 thereafter fixedly bonding the extruded fiber 305 to the base material 500. In one embodiment, the roller 925 can be heated to assist in the bonding of the fiber 305 to the base material 500. Alternatively, the roller 925 can be cooled in order to assist in cooling the fiber 305 and/or the base material 500 as the fiber 305 it is bonded to the base material 500.

Figure 40:
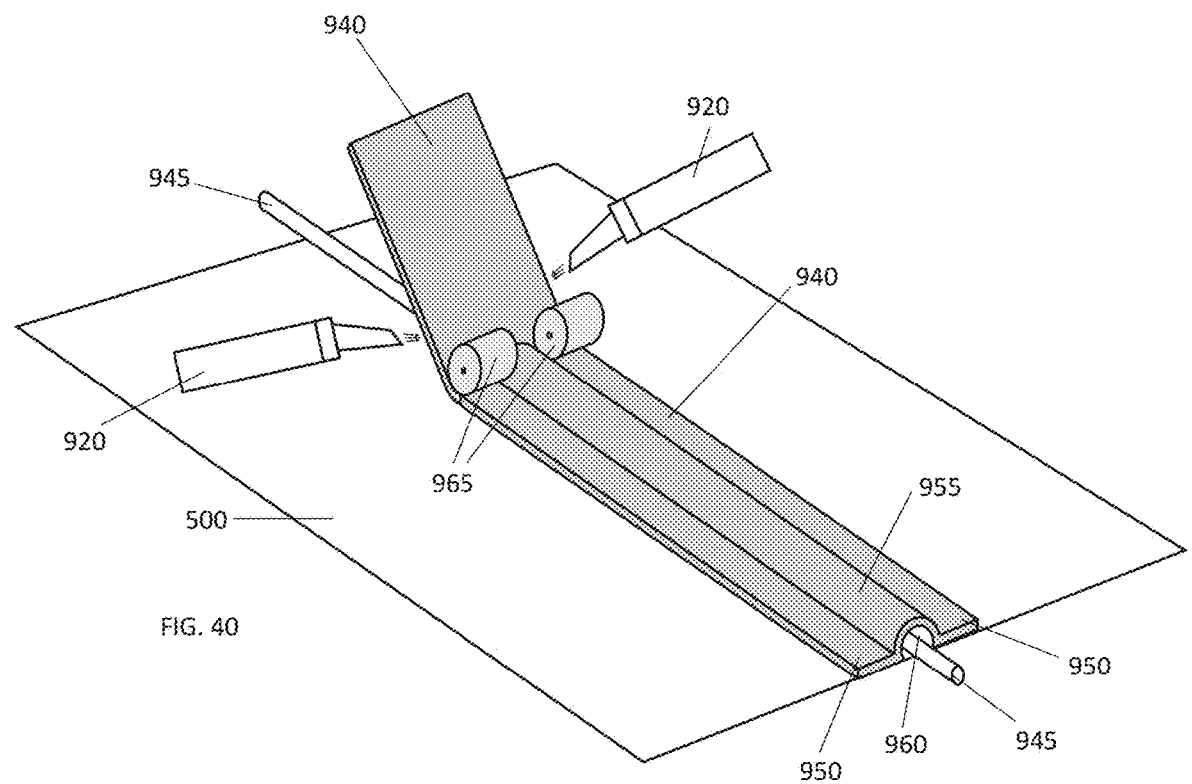
FIG. 40 is a schematic perspective view of another method for attaching a wound element to a base material, in accordance with some embodiments of the invention.

It may be beneficial, in certain embodiments, to wind a multi-component element onto a base material 500 to form a material portion having unique structural benefits. FIG. 40, for example, shows a method of laying a tape 940 over a fiber 945 such that the tape 940 is only bonded to the base material 500 at its edges 950, with a central portion 955 forming, with the base material 500, a hollow channel 960 through which the fiber 945 is free to extend. This may be beneficial, for example, in forming lacing or other shoe closure and tightening systems, with the fiber 945 acting as a lacing element to tighten the upper onto a foot when pulled. In operation, the fiber 945 and tape 940 are passed below a roller system 965 which is adapted to only press and bond the side edges of the tape 940 to the base material 500 while leaving the central portion 955 of the tape 940 unbonded to the base material 500. As described above, heating elements, such as heat guns 920 can be used to heat the edge portions 950 of the tape 940 to assist in bonding the tape to the base material 500.

Figure 41:
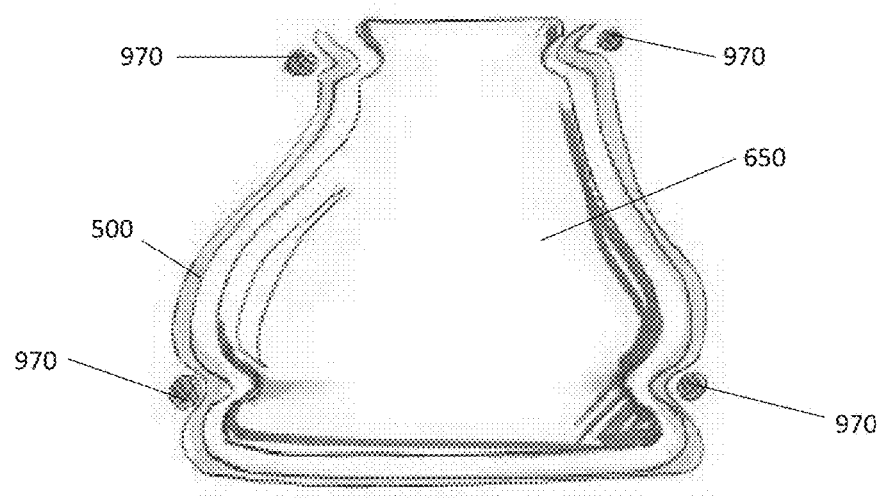
FIG. 41 is a schematic view of an exemplary method of holding a base material to a last, in accordance with some embodiments of the invention.

In one embodiment, an unbonded securing element 970 can be positioned over a base material 500 to hold the base material 500 in place over a last 650 during the winding process, as shown in FIG. 41. This securing element 970 can be an elastic element that is stretched into position to bias the base material 500 against the last 650 in certain locations or be non-elastically tightened and tied in place over the base material 500 and last 650. During operation, one or more fibers are wound over the base material 500 on the last 650, with the securing elements 970 holding on the base material 500 securely in place to ensure that it doesn't slip or stretch when the fiber is wound onto it. After winding of the fiber(s) onto the base material 500 has been completed, the securing element(s) 970 can be pulled out from between the base material 500 and wound fibers, thereby allowing the finished upper to be removed from the last 650. In alternative embodiments, any appropriate combination of last surface texturing and material gripping elements can be used to hold base material portions in place during winding.

In one embodiment two lasts can be placed together back-to-back, with the fiber, or fibers, being wound around both lasts at once. After winding is completed, the wound material can be cut at the location at which the lasts meet, thereby forming two separate uppers (and, in one embodiment, a matching pair of left and right uppers).

In one embodiment, the methods and systems described herein can be used to create wound material portions for other consumer objects, such as apparel, sports accessories, protective equipment, and athletic equipment.

The methods and systems described herein allow for the manufacture of multiple articles of footwear having a consistent pattern of wound material, and therefore consistent performance and aesthetic characteristics, or allow for the manufacture of articles of footwear customized for a specific individual or group of individuals. For example, one or more physiological characteristics of the foot of an individual can be analyzed to determine a wrap pattern for a wound element specifically customized to that individual. Such physiological structural characteristics may include at least one of a foot shape, a foot size, a shoe wear pattern, a foot pressure distribution when standing, a foot pressure distribution during a physical movement, an injury profile, a bone structure and/or distribution, a sweat gland distribution, a moisture level, a temperature, a circulation metric, a muscle activity, a friction metric, a blood pressure, a heart rate, a volume change, a hydration level, a perspiration level, a ligament structure, a toe shape, a toe distribution (e.g., the location of the metatarsophalangeal joints on a foot), a heel shape, and/or an arch shape.

The resulting wrap pattern for the wound element can be customized to support/optimize a performance characteristic of the individual (e.g., support one or more athletic movement specific to the individual), provide optimized fit and/or comfort, support a physiological or medical condition specific to the individual, and/or relieve stress, pressure, friction or discomfort associated with a physiological or medical condition or an athletic motion specific to the individual. Performance characteristics for which the wrap pattern of a wound fiber can be customized for an individual include, but are not limited to, a metric representative of an interaction between the foot of the user and the ground during at least a portion of a ground contact phase of a gait cycle (or ground contact phase of an athletic motion such as running, jumping, cutting, turning, kicking, etc.).

In one embodiment, the input parameter for determining a customized wound fiber distribution on an upper of an article of footwear may include at least one of pressure measurements over at least a portion of a foot of the user and force measurements between at least a portion of the foot and the ground surface during at least a portion of the ground contact phase of the gait cycle of an individual. Additional parameters and methods for utilizing physiological and/or performance metrics and data from an individual or group of individuals to customize an article of footwear are disclosed in U.S. Pat. No. 9,788,600 entitled "Customized Footwear, and Systems and Methods for Designing and Manufacturing Same," as issued to the assignee/applicant in the instant case on Oct. 17, 2017, the disclosure of which is incorporated herein by reference in its entirety. Such data can be measured on or proximate the foot, for example through use of stress, strain, elongation, temperature, pressure, force, acceleration, and/or other sensors place on or proximate the foot to provide data on the physiological and/or performance characteristics of the foot. In addition, or alternatively, optical foot scans, motion capture, temperature scanning, or other non-contact data capture techniques can be used. Such data can provide a map of instantaneous and/or averaged stretch, strain, force, and/or pressure magnitudes and directions over an article of footwear worn by an individual during an activity.

An exemplary process for providing a customized article of footwear for an individual is described below. In this embodiment, one or more data capture systems can be used to identify specific physiological and/or performance metrics associated with an individual. Depending on the specific metrics to be measured, this data capture can be performed in a store of other controlled environment or be performed remotely (for example, at home or during an individual's day-to-day physical activity). The data capture system can include a sensor-enabled sock, shoe, or other sensor-enabled wearable device, a smartwatch or other digital wearable technology, a scanning device, or any other appropriate data capture system. Upon obtaining the required data it can be analyzed in light of the individuals' requirements and/or preferences and in view of the specific requirements for the resulting footwear (e.g., comfort, medical, performance, support and/or aesthetic benefits, etc.). A specific distribution of one or more wound fiber can then be calculated (accounting for the direction, bond strength, resistance to stretch, support, protection, aesthetics and/or other parameters controllable through the inclusion of wound elements on an upper), which can then be applied to a customized or standardized base material form (e.g., a fabric bootie upper) and incorporated into the finished customized shoe. The individual can also select aesthetic elements of the customized footwear through selection of bootie color and shape, wound fiber color, size, and texture, sole shape and style, etc. In one embodiment, the customized upper incorporating the wound fiber(s) can be combined with a customized sole element to produce a fully customized article of footwear.

Figure 42A:
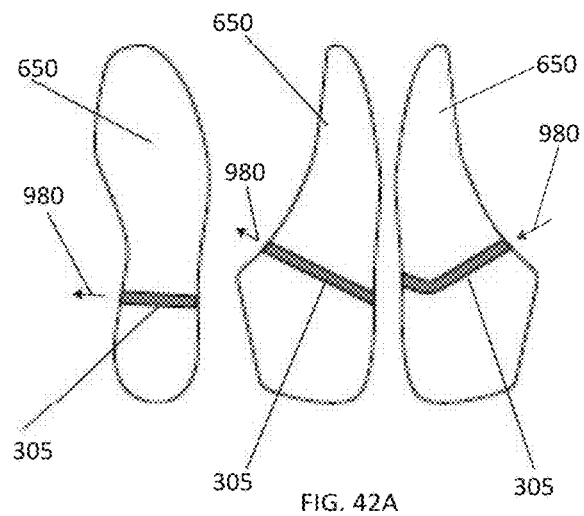
Figure 42B:
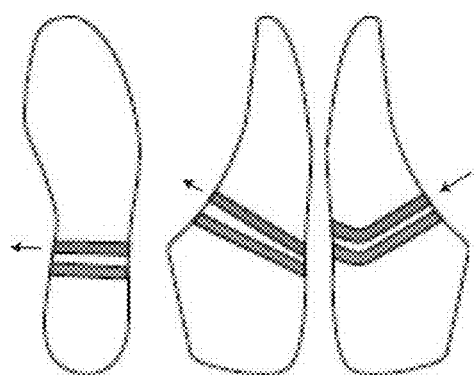
Figure 42C:
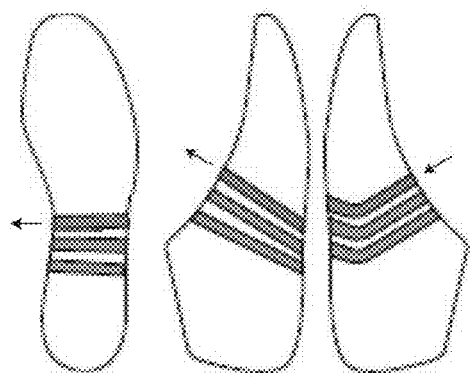
Figure 42D:
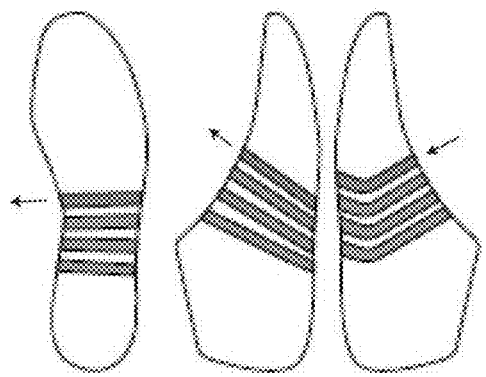
Figure 42E:
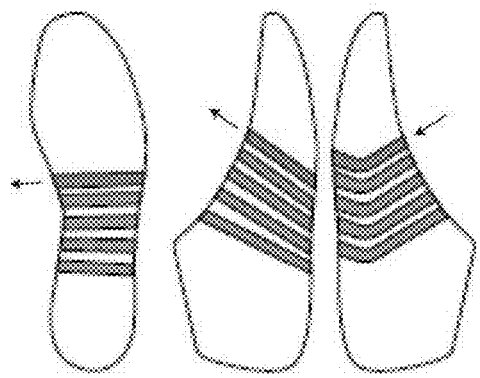
Figure 42F:
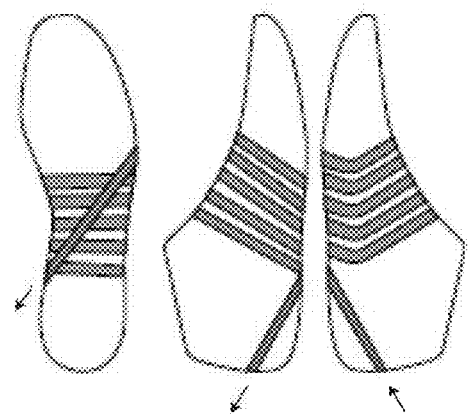

An exemplary wind path for winding a fiber 305 onto a last 650 is shown in FIGS. 42A through 42K. A bootie (not shown) can be placed over the last prior to winding, so that the fiber 305 is wound over, and tacked to, the bootie to form the finished upper. The wind direction 980 is indicated by the arrow. The wind path for the first 360° rotation of the last 650 (i.e., the first wind) is shown in FIG. 42A. The wind path for the second wind of the fiber 305 is shown in FIG. 42B. The wind path for the third wind of the fiber 305 is shown in FIG. 42C. The wind path for the fourth wind of the fiber 305 is shown in FIG. 42D. The wind path for the fifth wind of the fiber 305 is shown in FIG. 42E. The wind path for the sixth wind of the fiber 305 is shown in FIG. 42F. The wind path for the seventh wind of the fiber 305 is shown in FIG. 42G. The wind path for the eighth wind of the fiber 305 is shown in FIG. 42H. The wind path for the ninth wind of the fiber 305 is shown in FIG. 42I. The wind path for the tenth wind of the fiber 305 is shown in FIG. 42J. The wind path for the last wind of the fiber 305 is shown in FIG. 42K, with the fiber 305 finishing on the underside of the bootie.

The embodiment shown in FIGS. 42A through 42K includes a plurality of winds extending around the midfoot region of the bootie, with a second plurality of winds extending from the midfoot around a heel portion of the bootie. In alternative embodiments, the number, orientation, distribution, direction, and curvature of the winds can be arranged in any appropriate manner, depending upon the specific requirements for the upper. In certain embodiments, the specific position, distribution, and curvature of the winds can be customized, as described hereinabove.

In an alternative embodiment, one or more wound elements can be incorporated into or onto at least a portion of an article of apparel. For example, a wound element can be incorporated into one or more arm portions and/or torso portions of an article of apparel for an upper portion of a body of an individual, and/or be incorporated into a torso portion and/or one or more leg portions of an article of apparel for a lower body portion of an individual. The location, direction, and structure of these wound elements could, in one embodiment, provide targeted support and/or compression benefits and/or provide directional stretch resistance to the garment to support a specific body movement of the wearer.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method of manufacturing at least a portion of an upper for an article of footwear, the method comprising the steps of:

providing a support structure;

providing a fiber delivery system comprising at least one heating element adapted to heat a fiber to a temperature sufficient to at least partially melt the fiber;

placing a fabric base material for at least the portion of the upper for the article of footwear over the support structure, the base material comprising at least one first region and at least one second region;

tacking a first end of a first heat-fusible fiber onto the base material;

moving at least one of the support structure or the fiber delivery system with respect to each other to wind the first heat-fusible fiber onto the at least one first region of the base material;

cutting a second end of the first heat-fusible fiber upon positioning of the first heat-fusible fiber onto the first region of the base material; and heating at least a portion of the first heat-fusible fiber with the at least one heating element to fixedly hold it in a wound arrangement on the at least one first region of the base material to form an upper portion for incorporation into an article of footwear, wherein the first heat-fusible fiber is substantially absent from the second region of the base material.

2. The method of claim 1, wherein heating the portion of the first heat-fusible fiber comprises applying energy to the first heat-fusible fiber through the heating element prior to the first heat-fusible fiber being wound onto the first region of the base material to at least partially fuse the first heat-fusible fiber to the first region of the base material.

3. The method of claim 1, further comprising placing a covering material over at least a portion of the upper portion.

4. The method of claim 1, where the support structure comprises at least a portion of a shoe last.

5. The method of claim 1, wherein the fiber delivery system is adapted to controllably unspool a spool of fiber onto a surface of the base material.

6. The method of claim 1, wherein the fiber delivery system comprises at least one cutter for cutting the first fiber.

7. The method of claim 1, wherein moving the support structure with respect to the fiber delivery system comprises rotating the support structure around a first axis of rotation associated with the support structure.

8. The method of claim 1, wherein moving the support structure with respect to the fiber delivery system comprises rotating the fiber delivery system around a first axis of rotation associated with the support structure.

9. The method of claim 1, wherein the first heat-fusible fiber comprises at least one of a thread, a filament, a cord, a lace, a ribbon, a tape, or a band.

10. The method of claim 1, further comprising winding at least one second fiber around the support structure at least one of simultaneously with or after winding the first heat-fusible fiber onto the at least one first region of the base material.

11. The method of claim 10, wherein the second fiber comprises at least one of a different structural property or a different aesthetic property to the first heat-fusible fiber.

12. The method of claim 1, wherein moving the support structure with respect to the fiber delivery system to wind the first heat-fusible fiber onto the at least one first region of the base material comprises laying at least a portion of the first heat-fusible fiber over the base material in a crossing configuration.

13. The method of claim 1, wherein at least a portion of the first heat-fusible fiber is wound onto the at least one first region of the base material in a direction parallel to at least one predominant direction of stress to which the finished article of footwear will be subject.

14. The method of claim 1, wherein the at least one first region of the base material comprises at least one of a forefoot portion, a midfoot portion, or a heel portion of the article of footwear.

15. The method of claim 1, wherein at least one of the first end of the first heat-fusible fiber or the second end of the first heat-fusible fiber is positioned in an underfoot portion of the at least one first region of the base material.

16. The method of claim 1, wherein the first heat-fusible fiber is wound onto the at least one first region of the base material in a plurality of winds.

17. The method of claim 16, wherein portions of two adjacent winds of the first heat-fusible fiber are substantially parallel.

18. The method of claim 16, wherein portions of two adjacent winds of the first heat-fusible fiber cross.

19. An article of footwear manufactured according to the method of claim 1.

* * * * *